US008000277B2

(12) United States Patent
Momona

(10) Patent No.: US 8,000,277 B2
(45) Date of Patent: Aug. 16, 2011

(54) MOBILE COMMUNICATION NETWORK SYSTEM AND MOBILE COMMUNICATION METHOD

(75) Inventor: Morihisa Momona, Tokyo (JP)

(73) Assignee: NEC Corporation, Tokyo (JP)

( * ) Notice: Subject to any disclaimer, the term of this patent is extended or adjusted under 35 U.S.C. 154(b) by 1928 days.

(21) Appl. No.: 10/512,144

(22) PCT Filed: Apr. 25, 2003

(86) PCT No.: PCT/JP03/05322
§ 371 (c)(1),
(2), (4) Date: Oct. 22, 2004

(87) PCT Pub. No.: WO03/092189
PCT Pub. Date: Nov. 6, 2003

(65) Prior Publication Data
US 2005/0163096 A1  Jul. 28, 2005

(30) Foreign Application Priority Data
Apr. 25, 2002  (JP) ................................ 2002-123502

(51) Int. Cl.
H04B 7/00 (2006.01)
(52) U.S. Cl. ..................................... 370/310.2; 370/349
(58) Field of Classification Search .................. 370/349, 370/401, 352, 328, 457, 913, 902, 464, 310.2; 370/331, 338, 341, 329, 400, 402, 348, 389; 455/555, 461, 554, 426, 435, 455
See application file for complete search history.

(56) References Cited

U.S. PATENT DOCUMENTS

| | | | | |
|---|---|---|---|---|
| 5,875,185 A * | 2/1999 | Wang et al. | ................... | 370/331 |
| 6,487,406 B1 * | 11/2002 | Chang et al. | ............... | 455/422.1 |
| 6,574,221 B1 * | 6/2003 | Petersen | .................... | 370/395.1 |
| 6,687,243 B1 * | 2/2004 | Sayers et al. | .................. | 370/356 |
| 6,973,076 B2 * | 12/2005 | Takeda et al. | ................. | 370/356 |
| 6,975,850 B1 * | 12/2005 | Hurtta et al. | ................... | 455/405 |
| 6,985,734 B2 * | 1/2006 | Niska | ............................ | 455/445 |
| 7,003,282 B1 * | 2/2006 | Ekberg | .......................... | 455/411 |
| 2002/0013150 A1 | 1/2002 | McKenna et al. | | |
| 2002/0062379 A1 * | 5/2002 | Widegren et al. | ............. | 709/227 |
| 2002/0133595 A1 * | 9/2002 | Kimura et al. | ................. | 709/227 |
| 2002/0176378 A1 * | 11/2002 | Hamilton et al. | ............. | 370/328 |

(Continued)

FOREIGN PATENT DOCUMENTS

| | | |
|---|---|---|
| CN | 1340985 | 8/2000 |
| JP | 2001-500342 | 1/2001 |

(Continued)

OTHER PUBLICATIONS

European Search Report dated Aug. 30, 2010.

Primary Examiner — Brenda Pham
(74) Attorney, Agent, or Firm — McGinn IP Law Group, PLLC

(57) ABSTRACT

The mobile communication network system of the present invention is made up from a mobile communication network (MNW), a plurality of external networks (EX1-EX3), a plurality of mobile terminals (x, y, z), a plurality of gateways (EGW1-EGW3) for connecting the external networks (EX1-EX3) and mobile communication network (MNW), and a plurality of radio access points (APa1-APc2) for connecting the mobile terminals (x, y, z) to the mobile communication network (MNW). When packets are transmitted and received between mobile terminals (x, y, z) within the mobile communication network (MNW), the packets are communicated, not by way of external networks (EX1-EX3), but by way of virtual networks that correspond to each external network (EX1-EX3) that have been prepared on the mobile communication network.

19 Claims, 27 Drawing Sheets

U.S. PATENT DOCUMENTS

| | | | | |
|---|---|---|---|---|
| 2002/0176414 A1* | 11/2002 | Miki et al. | | 370/389 |
| 2003/0026229 A1* | 2/2003 | Larson et al. | | 370/338 |
| 2004/0017798 A1* | 1/2004 | Hurtta et al. | | 370/352 |
| 2004/0168051 A1* | 8/2004 | Guo et al. | | 713/153 |
| 2005/0207340 A1* | 9/2005 | O'Neill | | 370/230 |

FOREIGN PATENT DOCUMENTS

| | | |
|---|---|---|
| JP | 2001-326697 | 11/2001 |
| WO | WO 99/33319 | 7/1999 |
| WO | WO 00/28752 | 5/2000 |
| WO | WO 01/39483 A2 | 5/2001 |

* cited by examiner

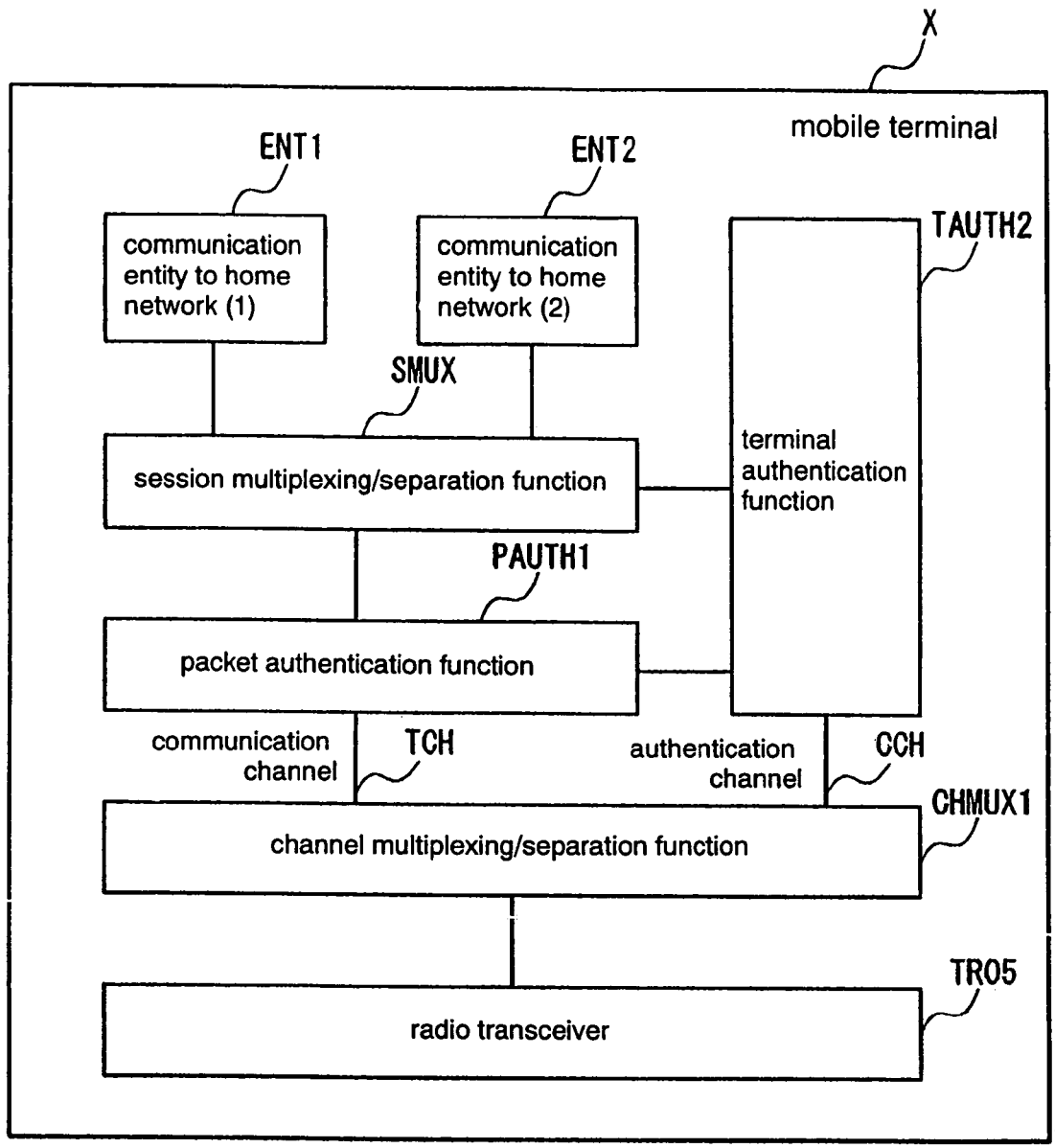

Fig. 9

200 home network information management table

| home network ID | mobile terminal ID for home network | home network–mobile terminal SA |
|---|---|---|
| home network #1 | I D # 1    221 | Home  SA#1    231 |
| home network #2 | I D # 2    222 | Home  SA#2    232 |
| | | |
| | | |

210 — home network ID
211 — home network #1
212 — home network #2
220 — mobile terminal ID for home network
230 — home network–mobile terminal SA

Fig. 10

300 session information management table

| home network ID | access point ID | access point – terminal SA | session ID | link information |
|---|---|---|---|---|
| home network #1 | AP#1 | AP-SA#1 | S-ID#1 | LINK#1 |
| home network #2 | AP#1 | AP-SA#2 | S-ID#2 | LINK#2 |
| | | | | |

600 session information management table

| mobile terminal ID 610 | external network ID 620 | access point – mobile terminal SA 630 | session ID 640 | link information 650 |
|---|---|---|---|---|
| mobile terminal #1 611 | external network #1 621 | SA#1 631 | session #1 641 | link information #1 651 |
| mobile terminal #1 612 | external network #2 622 | SA#2 632 | session #2 642 | link information #2 652 |
| mobile terminal #2 613 | external network #1 623 | SA#1 633 | session #1 643 | link information #1 653 |
| | | | | |

Fig. 16

700 authentication request packet

| radio access point ID | ⌒ 701 |
|---|---|
| mobile terminal ID | ⌒ 702 |
| mobile terminal authentication code for mobile network | ⌒ 703 |
| home network ID | ⌒ 704 |
| mobile terminal ID for home network | ⌒ 705 |
| mobile terminal authentication code for home network | ⌒ 706 |

Fig. 23

1100 terminal information management table

| mobile terminal ID (1110) | mobile communication server – mobile terminal SA (1120) | access point – mobile terminal SA (1130) |
|---|---|---|
| mobile terminal #1 (1111) | Home SA#1 (1121) | SA#1 (1131) |
| mobile terminal #2 (1112) | Home SA#2 (1122) | SA#2 (1132) |
| | | |
| | | |

Fig. 24

1200 home network – external network correspondence table

| home network ID (1210) | external network ID (1220) |
|---|---|
| home network #1 (1211) | external network #1 (1221) |
| home network #2 (1212) | external network #2 (1222) |
| | |
| | |

MOBILE COMMUNICATION NETWORK SYSTEM AND MOBILE COMMUNICATION METHOD

TECHNICAL FIELD

The present invention relates to a mobile communication network system and to a mobile communication method, and more particularly to mobile communication network system and a mobile communication method in which a mobile communication network provides a private leased line connection capability between external networks and mobile terminals.

BACKGROUND ART

Prior art in which a mobile communication network provides a private leased line connection capability between external networks and mobile terminals includes GPRS (General Packet Radio Service), which is a mobile communication technology prescribed by the ETSI (European Telecommunications Standards Institute) and 3GPP (Third-Generation Partnership Project). GPRS both supports movement of terminals and provides private leased line connection capabilities for connecting mobile terminals to specific external networks.

In addition, a mobile control technology that has been developed by IETF (Internet Engineering Task Force) includes Mobile IP (RFC2002) and a private network technology that includes IPSEC. A combination of these technologies supports the movement of terminals and can realize private leased line connections between mobile terminals and external networks.

Still further, technology proposals exist for using a virtual private network technology in a core network of a mobile communication network for connecting mobile terminals to external networks, one example being disclosed in http://www.microsoft.com/technet/treeview/default.asp?url=/TechNet/itsolutions/network/deploy/depovq/ieee802.asp.

However, the above-described technology has various problems as described hereinbelow.

In the above-described GPRS, tunnels are set between mobile terminals and the gateways with external networks, and all communication is realized by way of these tunnels. When communication is implemented between mobile terminals, packets transmitted by the mobile terminals are transmitted to the gateways with the external networks by way of the tunnels, and then again returned to the mobile terminals of the communication partners from the gateways with the external networks by way of the tunnels.

As a result, the technology of the prior art suffers from such problems as the considerable delay of the packets and the poor efficiency of circuit use due to wasted bandwidth within the mobile communication network.

In addition, there is also the problem of wasted bandwidth within the network and the poor efficiency of circuit use when implementing multicast communication to a plurality of mobile terminals, because the multicast packets are copied and transmitted for each tunnel of a mobile terminal at the gateway with an external network.

On the other hand, in the case of an IP based mobile communication network that employs Mobile IP and IPSEC, it is assumed that the mobile network and external networks are the IP network. The movement of terminals in this flat IP network is supported by Mobile IP. To further provide a private leased line connection capability, gateways are arranged between the mobile communication network and external networks, and tunnels are set between mobile terminals and the gateways by means of IPSEC.

Thus, when a private leased line connection capability is offered in an IP based mobile communication network that uses Mobile IP and IPSEC, all packets are exchanged by way of tunnels, and the same problems therefore occur in this configuration as occur in GPRS.

As a different configuration, when realizing communication between mobile terminals, it is also possible to directly set IPSEC tunnels between mobile terminals without implementing return communication by way of gateways. This configuration, however, provides no solution for the problems encountered in multicast communication. There is also the problem that management of tunnels becomes problematic when there are numerous communication partner mobile terminals.

In addition, in an IP based mobile communication network that uses Mobile IP and IPSEC, nodes in the mobile communication network can be freely accessed from the outside, and a security function is therefore necessary. For example, when realizing handover between radio access points, packets for handover requests and handover notifications between radio access points must be authenticated, and as a result, a security association must be established in advance for implementing authentication between radio access points. Such a method suffers from the problem that the management of the security association becomes troublesome with increase in the number of radio access points.

When a virtual private network technology is used in the core network of a mobile communication network and connections are provided to external networks, the problem occurs in the prior art that the connection to the private network is cut off when a terminal moves.

The present invention was realized in view of the above-described circumstances and has as its first object the provision of a mobile communication network system and mobile communication method for realizing an improvement in the efficiency of circuit use when implementing communication between mobile terminals.

Another object of the present invention is to provide a mobile communication network system and mobile communication method for realizing an improvement in the efficiency of circuit use in the multicast communication of mobile terminals.

It is yet another object of the present invention to provide a mobile communication network system and mobile communication method that eliminates the inconvenience of establishing a security association between mobile terminals or between nodes.

Finally, it is another object of the present invention to provide a mobile communication network system and mobile communication method that can continue a private line connection between a mobile terminal and an external network without cutting off the private leased line connection when the mobile terminal implements handover.

DISCLOSURE OF THE INVENTION

To achieve the above-described objects, the present invention is characterized by a mobile communication network system that is made up from a mobile communication network, a plurality of external networks, a plurality of mobile terminals, a plurality of gateways, and a plurality of radio access points, wherein the gateways connect the external networks and mobile communication networks, and the radio access points connect the mobile terminals to the mobile communication network; wherein, when packets are transmitted and received between mobile terminals within the mobile communication network, the packets are transmitted, not by way of external networks, but by way of virtual networks that correspond to each external network and that have been prepared in advance on the mobile communication network.

According to the present invention, when realizing communication between mobile terminals, communication is returned at the radio access point when each mobile terminal is subordinate to the same radio access point, communication is realized by way of the access network when each mobile terminal is subordinate to the same access network, and communication is realized through the core network when each mobile terminal is subordinate to different access networks. As a result, packets no longer need to be transferred by way of external network gateways, and the efficiency of circuit use of the access network is improved.

With regard to multicast communication, as well, in the prior art, multicast packets were copied a number of times equal to the number of mobile terminals that receive the multicast packets in external network gateways and then transmitted to mobile terminals in tunnels, and the efficiency of circuit use was therefore poor. In the present invention, however, packets on the core networks or access networks are transmitted using multicast, whereby an improvement in efficiency can be obtained.

In another mobile communication network system of the present invention, a mobile communication network is provided with a means for offering virtual networks that correspond to each external network, gateways are provided with a means for connecting external networks to corresponding virtual networks, and each mobile terminal is provided with a means for setting a session with a radio access point for the use of any external network. Further, the radio access points are provided with: means for transferring packets that have been received from any session to the virtual network that has been prepared for the external network that corresponds to that session; and means for transferring packets, which have been received from a virtual network that corresponds to any external network, to the session that has been set up for the external network by the mobile terminal that is the destination of these packets. The mobile communication network offers private leased line connections between the mobile terminals and external networks, and when transmitting and receiving packets between mobile terminals within the mobile communication network, communicates by way of virtual networks that have been prepared for use by the external networks on the mobile communication network.

The above-described configuration and means enables the transmission and reception of packets between mobile terminals and external networks. Further, when communication is realized between mobile terminals that are connected to the same external network, packets that have been transmitted from a mobile terminal by way of the session for use by that external network, following output from a radio access point, are transferred by way of the virtual network that is for use by that external network directly to the radio access point to which the mobile terminal of the communication partner is connected. The packets are then delivered to the mobile terminal of the communication partner by way of the session that has been set by the mobile terminal of the communication partner for use by this external network. In addition, multicast packets are transmitted as normal multicast packets on the virtual network for use by this external network, and after arriving at the radio access point, are delivered to the mobile terminal by way of the session for use by this external network.

According to another mobile communication network system of the present invention, radio access points are provided with: means for, when a mobile terminal is to be handed over from a current radio access point to which it is currently connected to a new radio access point, transferring information of all sessions that the mobile terminal has set to the new radio access point; and means for acquiring the setting information of all sessions that the mobile terminal has set that is transmitted in from the current radio access point.

According to the present invention, the private leased line connection between a mobile terminal and an external network can be maintained without being cut off when a mobile terminal is handed over.

According to yet another mobile communication network system of the present invention, a mobility management node is arranged within the mobile communication network, and this mobility management node is composed of a plurality of virtual mobility management nodes that have been prepared for each external network. Each of the virtual mobility management nodes is then provided with means for transmitting packets to and receiving packets from only a virtual network that has been prepared for use by a corresponding external network. Each of the mobile terminals are further provided with means for notifying positional information to the virtual mobility management node that corresponds to the external network to which that mobile terminal is connected. In addition, each of the virtual mobility management nodes is provided with: means for holding the positional information that has been reported from mobile terminals, and means for, upon receiving packets that are addressed to a mobile terminal, transferring the packets to the position that has been reported from the mobile terminal. By means of this configuration, virtual networks that have been prepared on the mobile communication network to correspond to each of the external networks can manage the positions of mobile terminals.

According to another mobile communication network system of the present invention, the mobile communication network is provided with a control/management virtual network. The mobile communication network is then further provided with: means for transmitting and receiving, by way of the control/management virtual network, packets for control and management that are exchanged between nodes that are arranged within the mobile communication network and that include radio access points and mobility management nodes; and means for refusing packets for control and management that have been received from sources other than the control/management virtual network.

According to the present invention, virtual core networks and virtual access networks make up private networks, whereby the inconvenience of establishing a security association between mobile terminals is eliminated.

Finally, according to the present invention, communication between nodes on a mobile communication network is also protected by the virtual access networks and virtual core networks for control and management, whereby the inconvenience of establishing a security association between nodes is eliminated.

BRIEF DESCRIPTION OF THE DRAWINGS

FIG. 7 shows the configuration of a mobile terminal in the first embodiment of the present invention.

FIG. 8 shows the configuration of a mobile communication network information management table that is held by a mobile terminal.

FIG. 9 shows the configuration of a home network information management table that is held by a mobile terminal.

FIG. 10 shows the configuration of a session information management table that is held by a mobile terminal.

FIG. 15 shows the configuration of a session information management table of a radio access point.

FIG. 16 shows the content of an authentication request packet that is transmitted to a mobile communication network authentication server by a radio access point.

FIG. 23 shows the configuration of a mobile terminal information management table.

FIG. 24 shows the configuration of a home network-external network correspondence table.

BEST MODE FOR CARRYING OUT THE INVENTION

Explanation next regards the details of preferable embodiments of the present invention with reference to the accompanying figures.

First Embodiment

Figure 1:
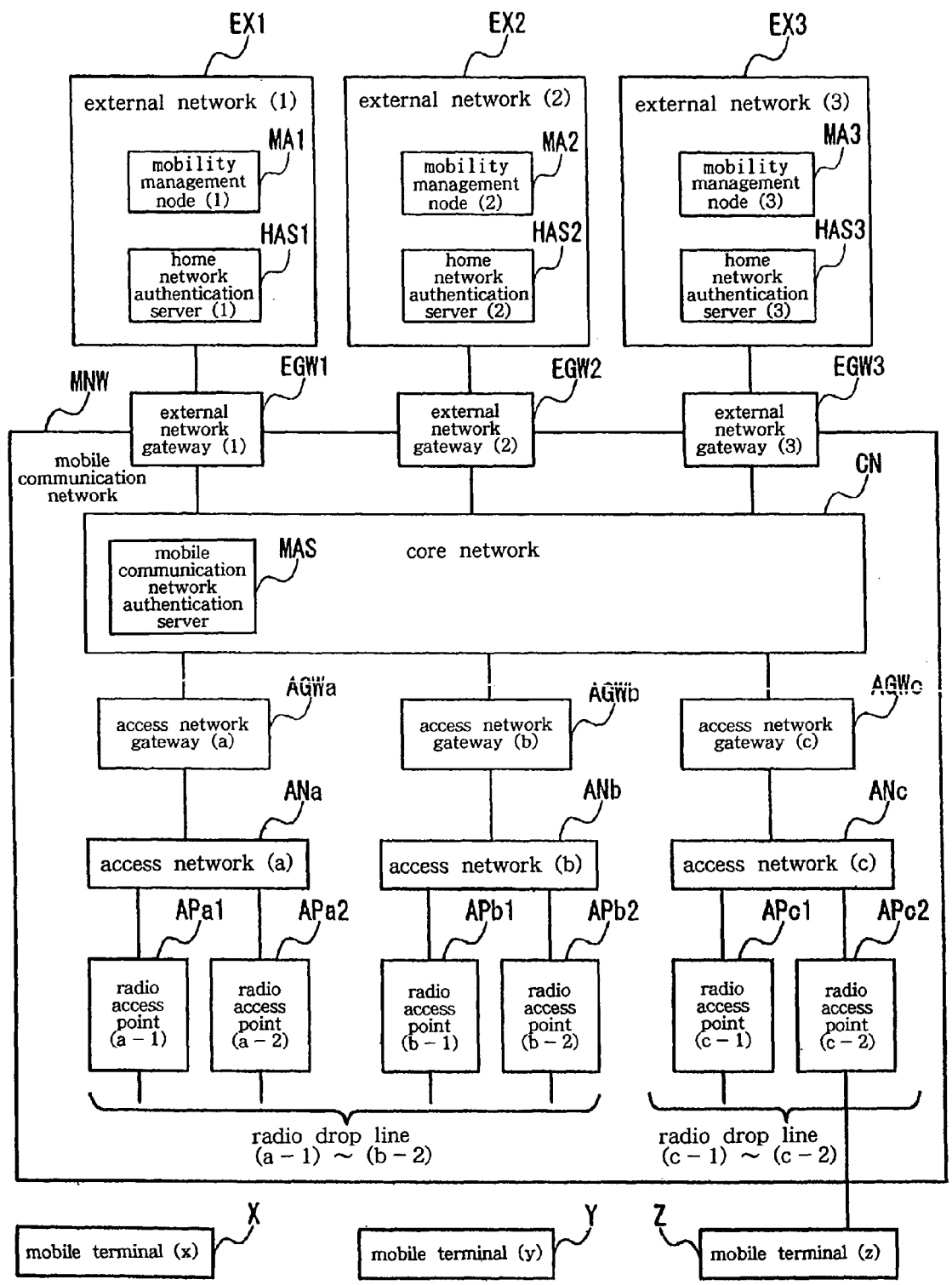
FIG. 1 shows the configuration of an overall network according to the first embodiment of the present invention.

Explanation next regards the first embodiment with reference to FIG. 1. FIG. 1 shows the configuration of an overall network. The overall network is composed of: a plurality of external networks EX1, EX2, and EX3; mobile communication network MNW that is connected to these external networks; and a plurality of mobile terminals X, Y, and Z that are connected to one or more of the external networks by way of mobile communication network MNW. The number of external networks and the number of mobile terminals are not limited to any specific number.

Mobile communication network MNW is composed of: core network CN; a plurality of access networks ANa, ANb, and ANc; a plurality of radio drop lines; a plurality of wired drop lines; external network gateways EGW1, EGW2, and EGW3 that connect core network CN to the external networks; access network gateways AGWa, AGWb, and AGWc that connect core network ON to access networks; radio access points APa1, APa2, APb1, and APb2 that connect access networks and radio drop lines; and radio access points APc1 and APc2 that connect access networks to wired drop lines. The number of access networks and the number of radio access points are not limited to any specific numbers.

Figure 2:
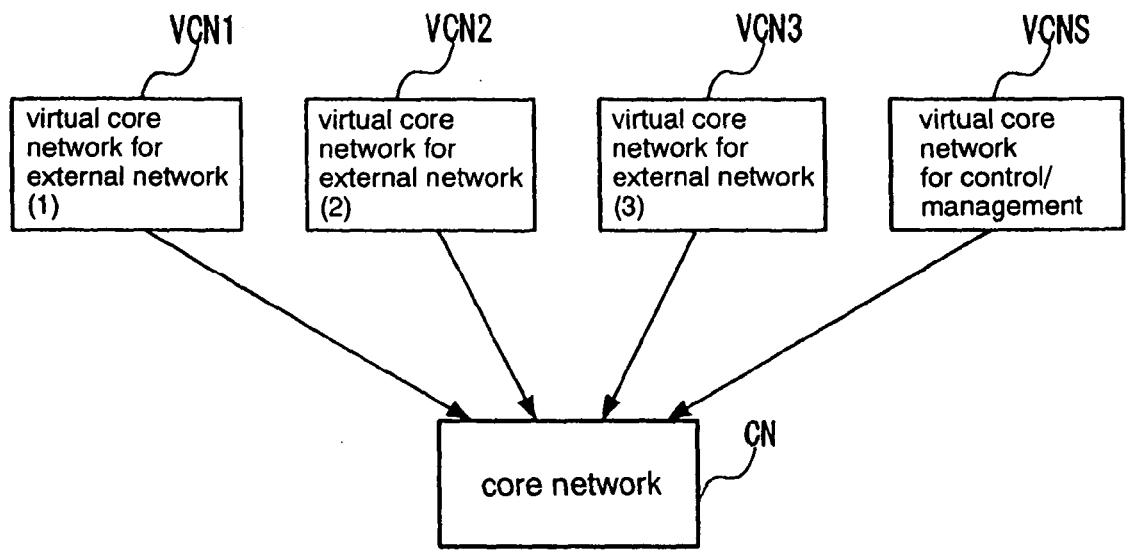
FIG. 2 shows the relation between a core network and a virtual core network that is multiplexed on the core network in the first embodiment of the present invention.

FIG. 2 shows the logical configuration of core network CN. Core network CN uses an existing virtual private network technology such as multi-protocol label switching, and a plurality of virtual core networks are multiplexed on physical core network ON. In this example, virtual core network VCN1 for external network (1), virtual core network VCN2 for external network (2), virtual core network VCN3 for external network (3), and virtual core network VCNS for control/management are multiplexed.

Figure 3:
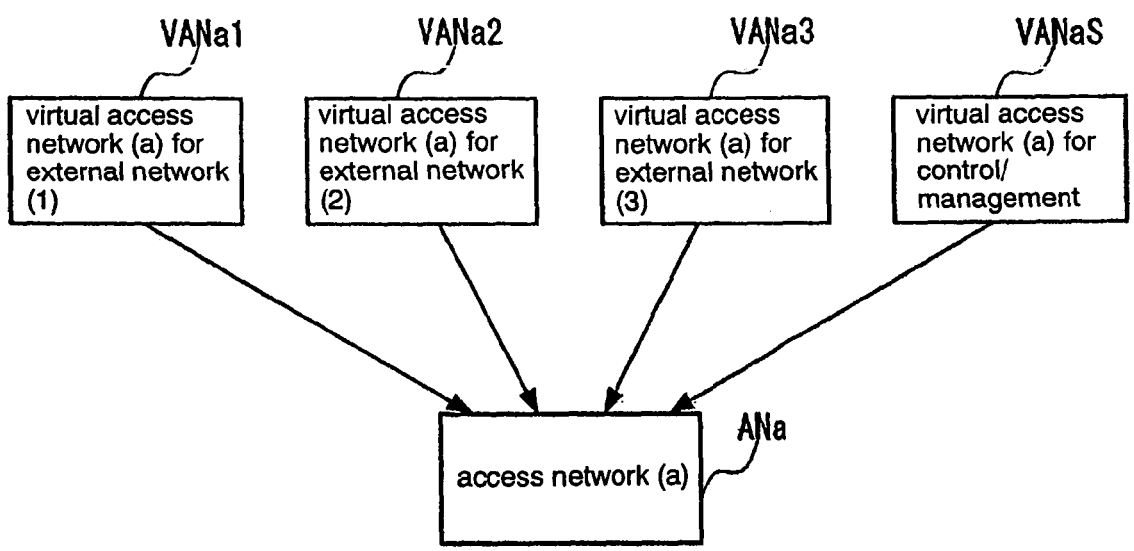
FIG. 3 shows the relation between a core network and a virtual access network that is multiplexed on the core network in the first embodiment of the present invention.

FIG. 3 shows the logical configuration of an access network. An access network uses an already existing virtual private network technology such as multiple-protocol label switching, a plurality of virtual access networks being multiplexed on physical access network ANa. In this example, virtual access network VANa1 for external network (1), virtual access network VANa2 for external network (2), virtual access network VANa3 for external network (3), and virtual access network VANaS for control/management are multiplexed.

Figure 4:
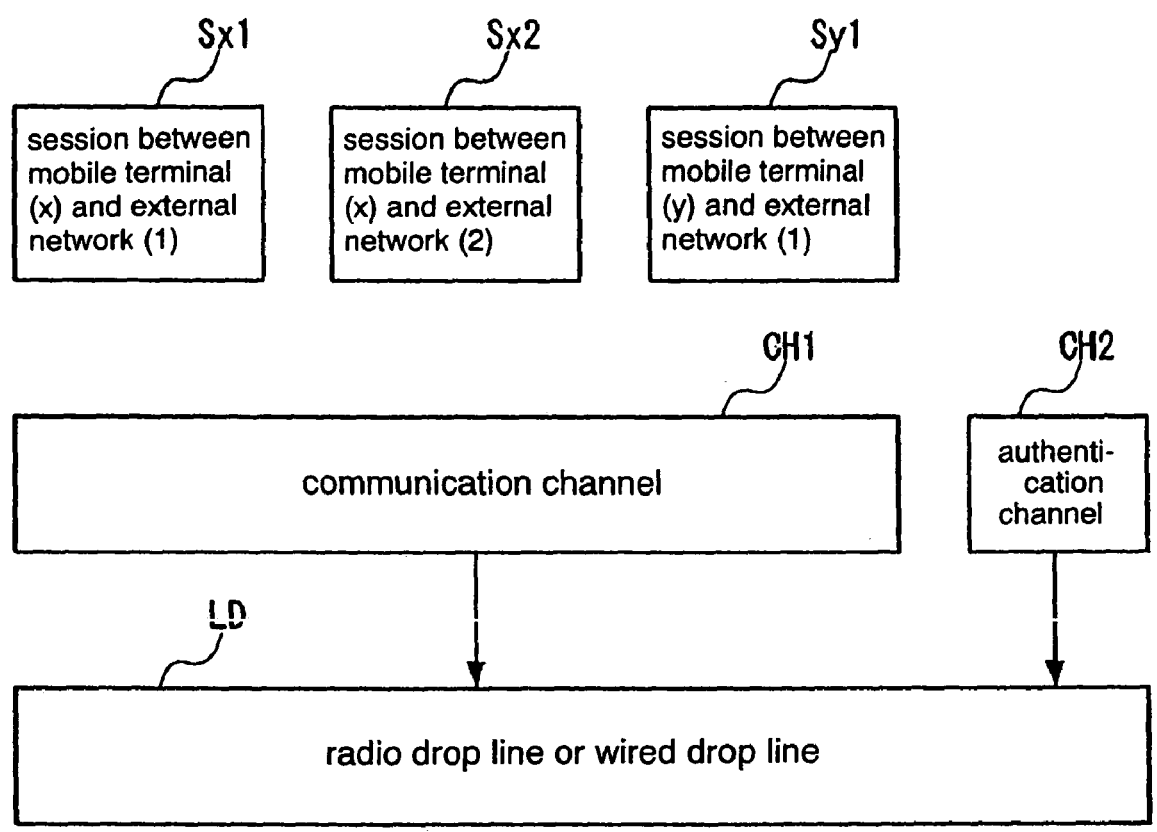
FIG. 4 shows the relation between radio or wired drop lines, authentication channels that are multiplexed on these lines, and communication channels; and the relation between mobile terminals that are multiplexed on communication channels and the sessions between external networks.

FIG. 4 shows the logical configuration of a radio drop line or a wired drop line. Communication channel CH1 and authentication channel CH2 are multiplexed on physical drop line LD. Sessions between each mobile terminal and each external network are multiplexed on communication channel CH1. In this case, session Sx1 between mobile terminal (x)X and external network (1) EX1, session Sx2 between mobile terminal (x)X and external network (2) EX2, and session Sy1 between mobile terminal (y)Y and external network (1) EX1 are multiplexed on communication channel CH1.

As for the identification and multiplexing/separation of authentication channel CH2 and communication channel CH1, if a dedicated construction has been prepared for this purpose through drop line LD link technology, this construction is used. Alternatively, if such a construction has not been prepared through link technology, connection identifiers are used to multiplex authentication channel CH2 and communication channel CH1 in the case of connection-directive link technology, and packet type identifiers are used to multiplex authentication channel CH2 and communication channel CH1 in the case of connectionless link technology.

As for the multiplexing and separation and session identification between mobile terminals and external networks, a dedicated construction that has been prepared by the link technology for this purpose is used if such a construction exists. Alternatively, if such a construction has not been prepared in the link technology, connection identifiers are used to multiplex and separate sessions in the case of a connection-directive link technology, and packet-type identifiers and virtual network identifiers are used to multiplex and separate sessions in the case of connectionless link technology.

Figure 5:
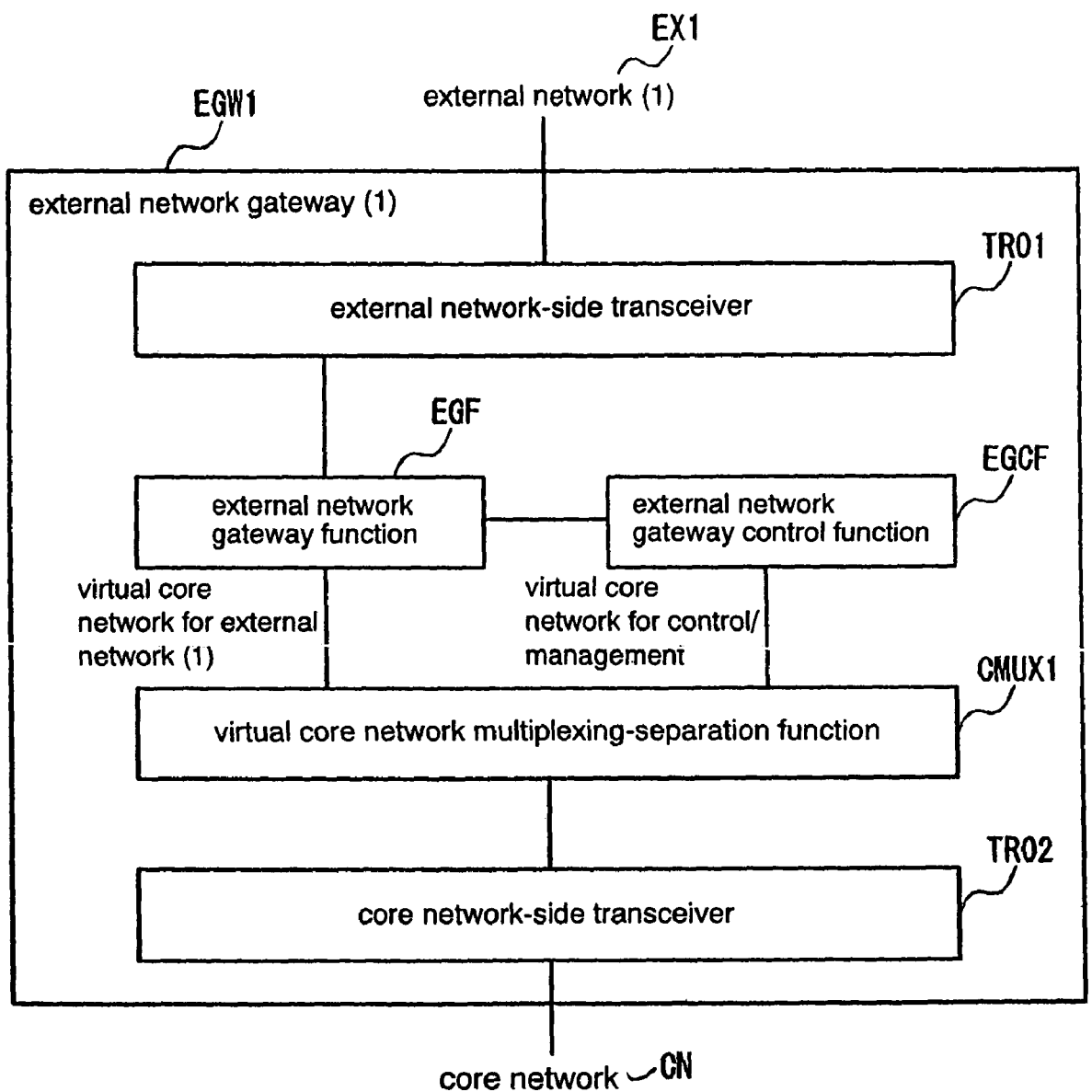
FIG. 5 shows the configuration of an external network gateway in the first embodiment of the present invention.

FIG. 5 shows the configuration of an external network gateway. External network gateway EGW1 is composed of: external network-side transceiver TR01, external network gateway function EGF, external network gateway control function EGCF, virtual core network multiplexing-separation function CMUX1, and core network-side transceiver TR02.

External network-side transceiver TR01 is connected to external network EX1 and transmits and receives packets. Core network-side transceiver TR02 is connected to core network CN and transmits and receives packets.

Virtual core network multiplexing-separation function CMUX1 separates packets that have been received from core network-side transceiver TR02 for each virtual core network; supplies as input to external network gateway function EGF packets that have been transferred in on external network (1) virtual core network VCN1 that corresponds to connected external network EX1; or supplies as input to external network gateway control function EGCF packets that have been transmitted in on control/management virtual core network VCNS.

Virtual core network multiplexing/separation function CMUX1 further transfers packets that have been received from external network gateway function EGF to the corresponding external network (1) virtual core network VCN1, transfers packets that have been received from external network gateway control function EGCF to control/management virtual core network VCNS, multiplexes these virtual core networks and supplies output to core network-side transceiver TR02.

External network gateway function EGF performs routing and filtering of packets between external network EX1 and core network CN.

External network gateway control function EGCF performs settings for filtering and path settings to external network gateway function EGF.

Figure 6:
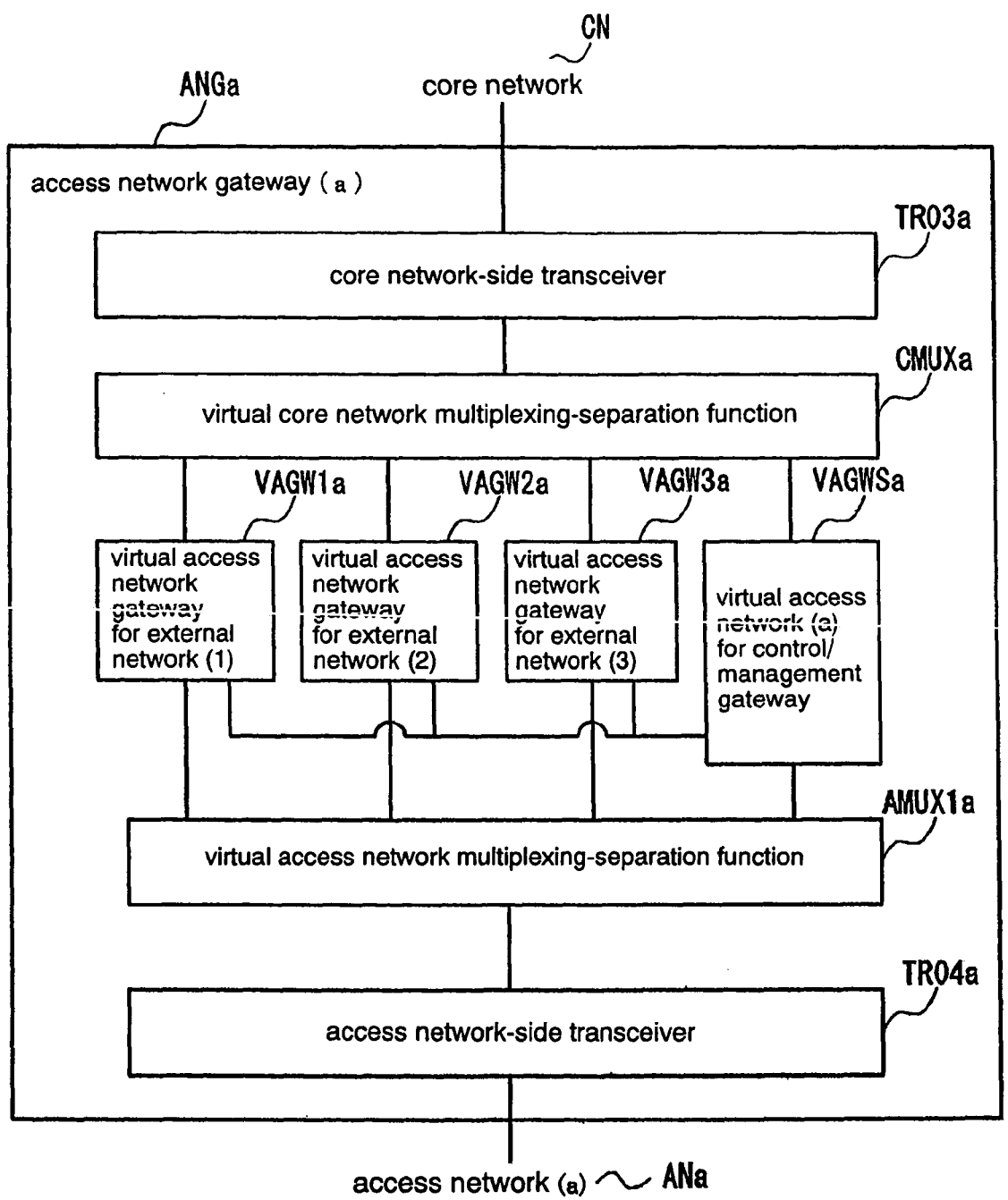
FIG. 6 shows the configuration of an access network gateway in the first embodiment of the present invention.

FIG. 6 shows the configuration of an access network gateway. Access network gateway ANGa is composed of: core network-side transceiver TR03a, virtual core network multiplexing/separation function CMUXa, external network (1) virtual access network gateway VAGW1a, external network (2) virtual access network gateway VAGW2a, external network (3) virtual access network gateway VAGW3a, control/management virtual access network gateway VAGWSa, virtual access network multiplexing/separation function AMUX1a, and access network-side transceiver TR04a.

Core network-side transceiver TR03a is connected to core network CN and transmits and receives packets. Access network-side transceiver TR04a is connected to access network ANa, and transmits and receives packets.

Virtual core network multiplexing/separation function CMUXa separates packets that have been received from core network-side transceiver TR03a for each virtual core network, supplies packets that have been received from external network (1) virtual core network VCN1 as output to external network (1) virtual access network gateway VAGW1a, and performs similar processing for external network (2) virtual core network VCN2, external network (3) virtual core network VCN3, and control/management virtual core network VCNS.

Virtual core network multiplexing/separation function CMUX a supplies packets that have been received as input from external network (1) virtual access network gateway VAGW1a to external network (1) virtual core network VCN1; performs similar processing for external network (2) virtual access network gateway VAGW2a, external network (3) virtual access network gateway VAGW3a, and control/management virtual access network gateway VAGWSa; multiplexes each virtual core network; and supplies output to core network-side transceiver TR03a.

Virtual access network multiplexing/separation function AMUX1a separates packets that have been received as input from access network-side transceiver TR04 for each virtual access network; supplies packets that have been received from external network (1) virtual access network VANa1 as output to external network (1) virtual access network gateway VAGW1a; and performs similar processing for external network (2) virtual access network VANa2, external network (3) virtual access network VANa3, and control/management virtual access network VANaS.

Virtual access network multiplexing/separation function AMUX1a supplies packets that have been received as input from external network (1) virtual access network gateway VAGW1a as output to external network (1) virtual access network VANa1; performs similar processing for external network (2) virtual access network gateway VAGW2a, external network (3) virtual access network gateway VAGW3a, and control/management virtual access network gateway VAGWSa; multiplexes each virtual access network; and supplies output to access network-side transceiver TR04a.

External network (1) virtual access network gateway function VAGW1a performs routing and filtering of packets between external network (1) virtual core network VCN1 and external network (1) virtual access network VANa1. The same holds true for external network (2) virtual access network gateway function VAGW2a and external network (3) virtual access network gateway function VAGW3a.

In addition to the above-described functions, control/management virtual access network gateway function VAGWSa sets the filtering and sets the path to each of virtual access network gateway functions VAGW1a, VAGW2a, and VAGW3a.

FIG. 7 shows the configuration of a mobile terminal. Mobile terminal X is made up by: radio transceiver TR05, channel multiplexing/separation function CHMUX1, packet authentication function PAUTH1, session multiplexing/separation function SMUX, terminal authentication function TAUTH2, and communication entities ENT1 and ENT2 to a plurality of home networks.

Radio transceiver TR05 transmits packets to and receives packets from radio drop lines.

Channel multiplexing/separation function CHMUX1 performs multiplexing and separation of the authentication channels CCH and communication channels TCH on radio drop lines. Packets on authentication channels CCH are transmitted to and received from terminal authentication function TAUTH2, and packets on communication channels TCH are transmitted to and received from packet authentication function PAUTH1.

Terminal authentication function TAUTH2 includes the mobile communication network information management table shown in FIG. 8, the home network information management table shown in FIG. 9, and the session information management table shown in FIG. 10.

The mobile communication network information management table that is shown in FIG. 8 includes terminal ID 110 and mobile communication network-mobile terminal security association 111. Terminal ID 110 is an ID for uniquely identifying terminals within the mobile communication network. Mobile communication network-mobile terminal security association 111 is information for carrying out authentication between a mobile communication network and mobile terminals. This information is assumed to be set in advance in mobile terminal X.

The home network information management table that is shown in FIG. 9 holds one or more items of information that are each composed of the set of home network. ID 210, home network terminal ID 220, and home network-mobile terminal security association 230. Home network ID 210 is an ID for uniquely identifying home networks. Terminal ID 220 is an ID for uniquely identifying terminals within a home network. Home network-mobile terminal security association 230 is information for carrying out authentication between a home network and a mobile terminal. This information is assumed to be set in advance in mobile terminal X.

The session information management table that is shown in FIG. 10 includes one or more items of information that are each composed of the set of: home network ID 310, radio access point ID 320, radio access point-mobile terminal security association 330, session ID 340, and link information 350.

This information is set when mobile terminal X performs terminal authentication, which is to be explained hereinbelow. Radio access point ID 320 is the ID of the radio access point to which the terminal is currently connected. Radio access point-mobile terminal security association 330 is information for authenticating, of packets that are transmitted and received between a radio access point and a terminal, packets other than authentication requests and authentication responses. Session ID 340 is ID for identifying the session that has been set with a radio access point, a session being prepared for each communication with a home network. Link information 350 is information that is specific to each link that is used for identifying the session and for multiplexing/separation. Link information 350 depends on the link technology that is employed, and is, for example, a connection identifier or virtual private network identifier.

Packet authentication function PAUTH1, based on previously described radio access point-mobile terminal security association 330, authenticates packets that have been received as input from channel multiplexing/separation function CHMUX1, and supplies only authenticated packets as output to session multiplexing/separation function SMUX.

In addition, packet authentication function PAUTH1, based on the previously described radio access point-mobile terminal security association 330, appends an authentication code to packets that have been received as input from session multiplexing/separation function SMUX, and applies these packets as input to channel multiplexing/separation function CHMUX1.

Session multiplexing/separation function SMUX, based on the previously described link information 350, determines the session that packets that have been received as input from packet authentication function PAUTH1 belong, and then turn over these packets to communication entity ENT1 or ENT2 of the corresponding home network. Session multiplexing/separation function SMUX further uses link information 350 of the corresponding session to make settings such that packets that have been handed over from the communication entities ENT1 and ENT2 of home networks are transmitted, and supplies the packets as output to packet authentication function PAUTH1.

Figure 13:
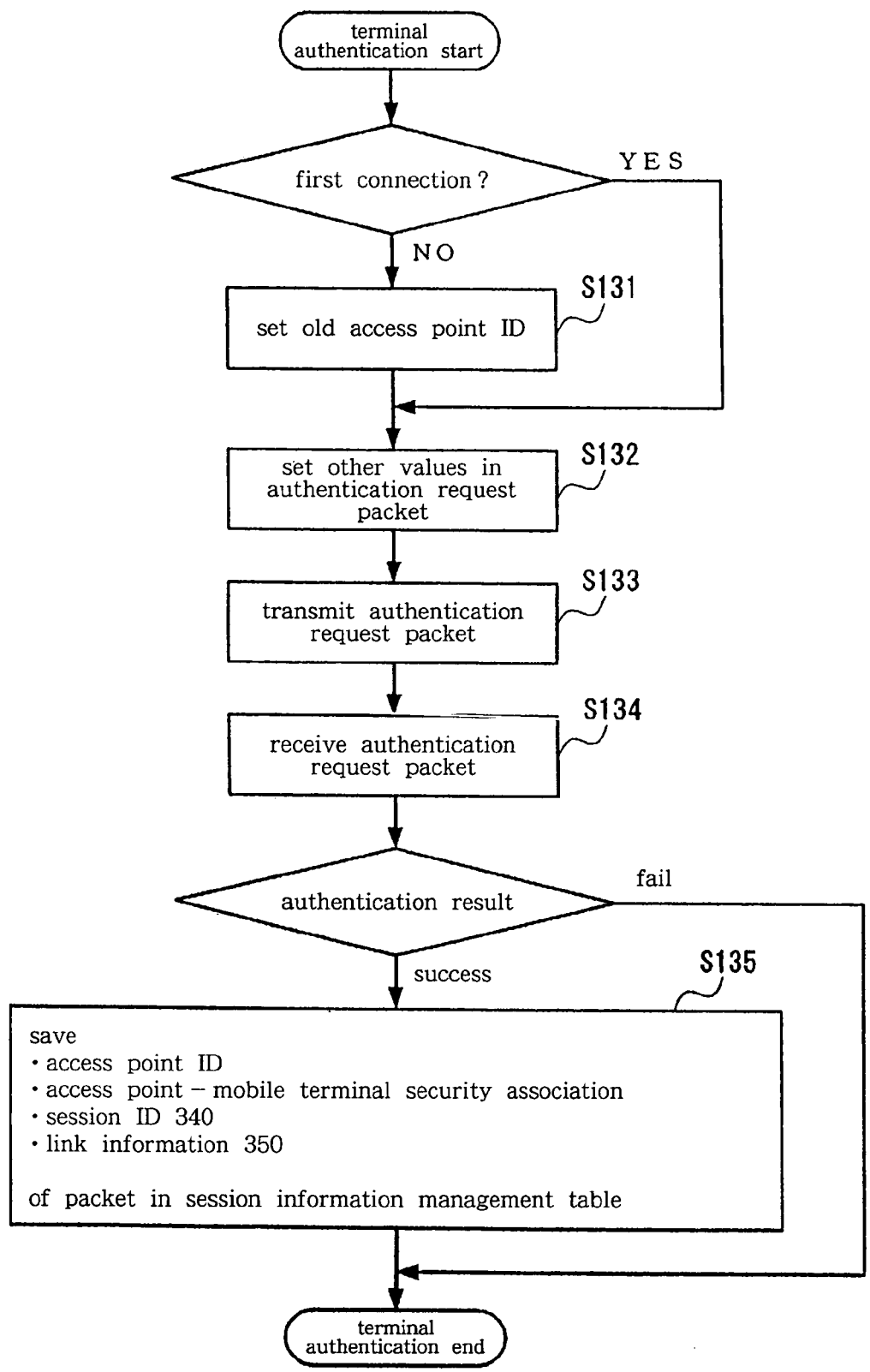
FIG. 13 is a flow chart showing the procedures for terminal authentication.

Explanation next regards the procedures of terminal authentication with reference to FIG. 13.

Figure 11:
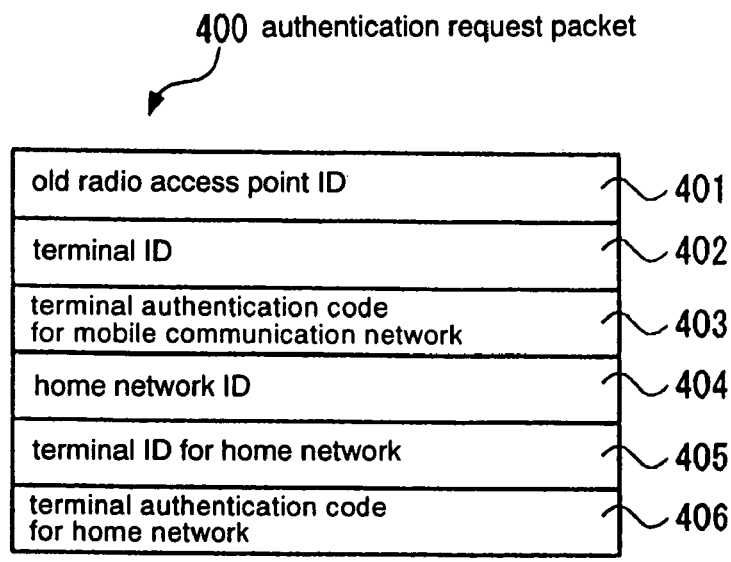
FIG. 11 shows the content of an authentication request packet that is transmitted to a radio access point by a mobile terminal.

When mobile terminal X initiates communication with a home network, terminal authentication function TAUTH2 generates authentication request packet 400 that is shown in FIG. 11 and transmits the authentication request packet to a radio access point. When generating an authentication request packet, the mobile terminal X does not set anything in old radio access point ID 401 when mobile terminal X first connects to the mobile communication network. When there is a radio access point that was previously connected, the mobile terminal sets ID 320 of this radio access point in old radio access point ID 401 (Step S131).

Appropriate information is set in mobile terminal ID 402, home network ID 404, and home network mobile terminal ID 405 of a authentication request packet based on the mobile communication network information management table (FIG. 8) and the home network information management table (FIG. 9). Further, information that is necessary for a mobile communication network to authenticate a mobile terminal is set in mobile communication network mobile terminal authentication code 403 based on mobile communication network-mobile terminal security association 111, and information that is necessary for a home network to authenticate mobile terminal X is set in home network mobile terminal authentication code 406 based on home network-mobile terminal security association 230. Values are set as described above to generate authentication request packet 400 (Step 132), and authentication request packet 400 is then transmitted to radio access point (Step 133).

Figure 12:
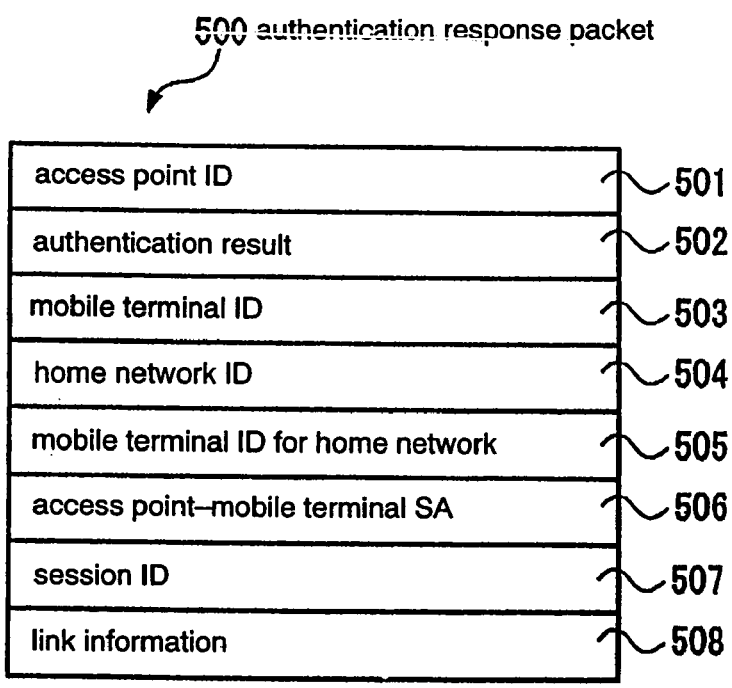
FIG. 12 shows the content of an authentication response packet that is transmitted to a mobile terminal by a radio access point.

In response, the radio access point returns the authentication response packet that is shown in FIG. 12. The returned authentication response packet is received (Step 134), and if authentication result 502 that is set in the authentication response packet indicates success, radio access point ID 501, radio access point-mobile terminal security association information 506, session ID 507, and link information 508 that are set in the authentication response packet are saved in session information management table (Step 135).

Figure 14:
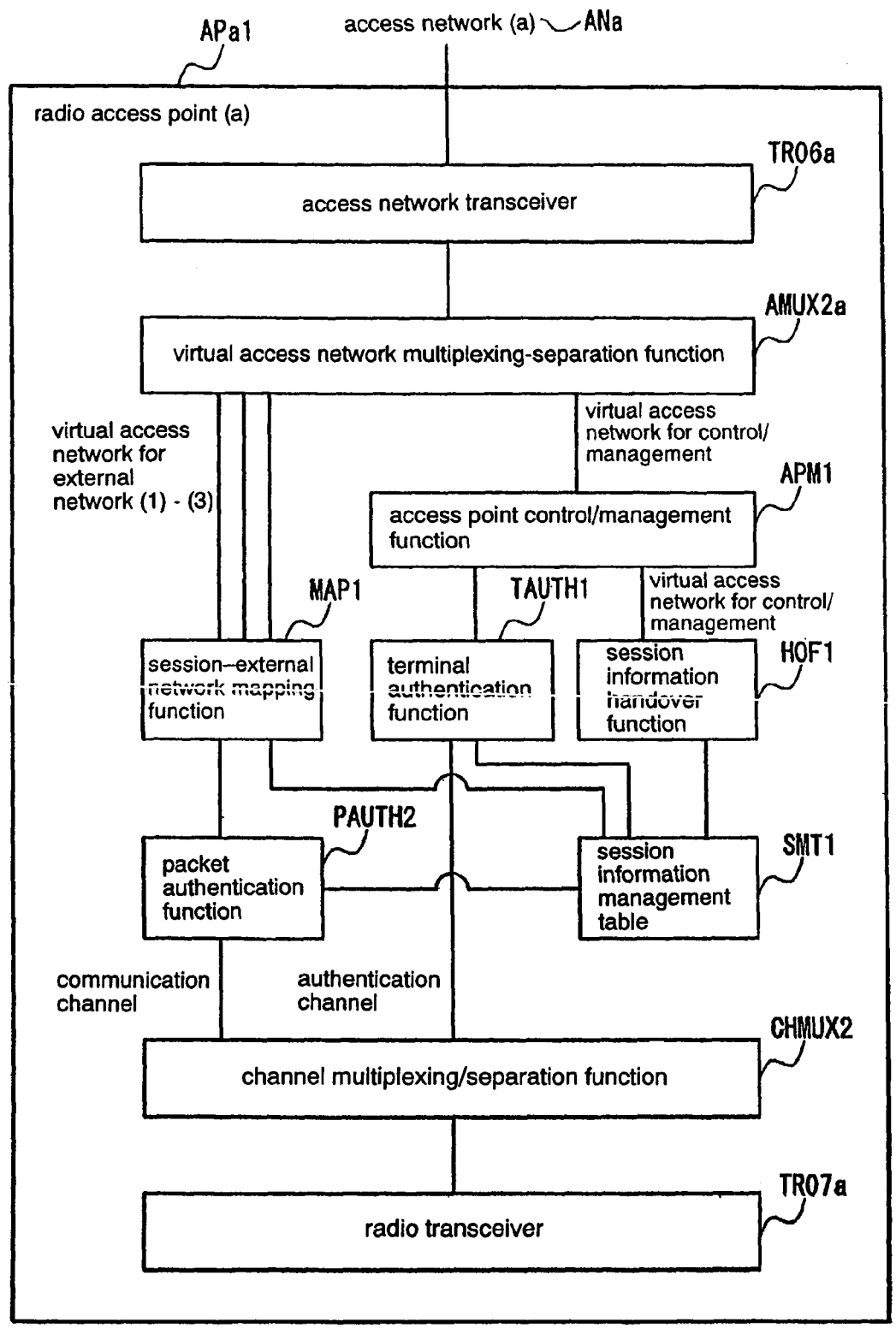
FIG. 14 shows the configuration of a radio access point.

FIG. 14 shows the configuration of a radio access point. Radio access point APa1 is made up from: access network-side transceiver TR06a, virtual access network multiplexing/separation function AMUX2a, session-external network mapping function MAP1, radio access point control/management function APM1, terminal authentication function TAUTH1, packet authentication function PAUTH2, session information handover function HOF1, session information management table SMT1, channel multiplexing/separation function CHMUX2, and radio transceiver TR07a.

Access network-side transceiver TR06a is connected to access network ANa and transmits and receives packets.

Radio transceiver TR07a transmits packets to and receives packets from radio drop lines.

Virtual access network multiplexing/separation function AMUX2a separates packets that have been received as input from access network-side transceiver TR06a for each virtual access network; applies packets that are on external network (1) virtual access network VANa1, external network (2) virtual access network VANa2, and external network (3) virtual access network VANa3 as input to session-external network mapping function MAP1; and applies packets that are on control/management virtual core network VANaS as input to radio access point control/management function APM1.

Virtual access network multiplexing/separation function AMUX2a further multiplexes, on each virtual access network, packets that have been received as input from session-external network mapping function MAP1 and that are directed to external network (1) virtual access network VANa1, external network (2) virtual access network VANa2, and external network (3) virtual access network VANa3, and packets that have been received as input from radio access point control/management function APM1 and that are directed to control/management virtual access network VANaS, and supplies the result as output to access network-side transceiver TR06a.

Channel multiplexing/separation function CHMUX2 separates signals that are received as input from radio transceiver TR07a for each channel, supplies the communication channels as input to packet authentication function PAUTH2, and supplies the authentication channels as input to terminal authentication function TAUTH1. Channel multiplexing/separation function CHMUX2 further multiplexes packets that have been received as input from packet authentication function PAUTH2 on the communication channel, multiplexes packets that have been received as input from terminal authentication function TAUTH1 on the authentication channel, and supplies the result as output to radio transceiver TR07a.

Session information management table SMT1 holds the content that is shown in FIG. 15. This content is: mobile terminal ID 610, external network ID 620 to which that terminal is connected, radio access point-mobile terminal security association 630 for authenticating packets from mobile terminals, session ID 640 for identifying sessions between mobile terminals and external networks, and link information 650 for identifying sessions; and the significance is equivalent to the information that is set in a mobile terminal. This information is set based on procedures that are to be explained hereinbelow by the terminal authentication function when a mobile terminal first connects to a network and carries out terminal authentication.

Packet authentication function PAUTH2 authenticates packets that have been received as input from channel multiplexing/separation function CHMUX2 based on radio access point-mobile terminal authentication security association 630 that is held in session information management table 600 that is shown in FIG. 15, and supplies the packets as output to session-external network mapping function MAP1.

Packet authentication function PAUTH2 further, based on radio access point-mobile terminal authentication security association 630 that is held in session information management table 600 that is shown in FIG. 15, appends an authentication code to packets that have been received as input from session-external network mapping function MAP1, and then supplies the packets as output to channel multiplexing/separation function CHMUX2.

Session-external network mapping function MAP1 checks the packets that have been received as input from packet authentication function PAUTH2, and identifies the session based on link information 650 that is held in session information management table 600 that is shown in FIG. 15. Session-external network mapping function MAP1 then, based on external network ID 620 that corresponds to this session, distributes the packets to the appropriate external network virtual access network and applies the packets as input to virtual access network multiplexing/separation function AMUX2a.

Session-external network mapping function MAP1 further checks packets that have been received as input from virtual access network multiplexing/separation function AMUX2a and identifies the session based on external network ID 620 and mobile terminal ID 610 that are held in session information management table 600 that is shown in FIG. 15. Session-external network mapping function MAP1 then uses the appropriate link information that corresponds to this session to perform settings for transmission, and supplies the packets as output to packet authentication function PAUTH2.

When the mobile terminal that is the destination of packets that have been received from a mobile terminal is subordinate to the same radio access point, session-external network mapping function MAP1 simply transmits these packets back without alteration.

Radio access point control/management function APM1 supplies packets that have been received as input from terminal authentication function TAUTH1 and session information handover function HOF1 as output to virtual access network multiplexing/separation function AMUX2a; and separates packets that have been received as input from virtual access network multiplexing/separation function AMUX2a and then supplies the separated packets to terminal authentication function TAUTH1 and session information handover function HOF1.

Figure 20:
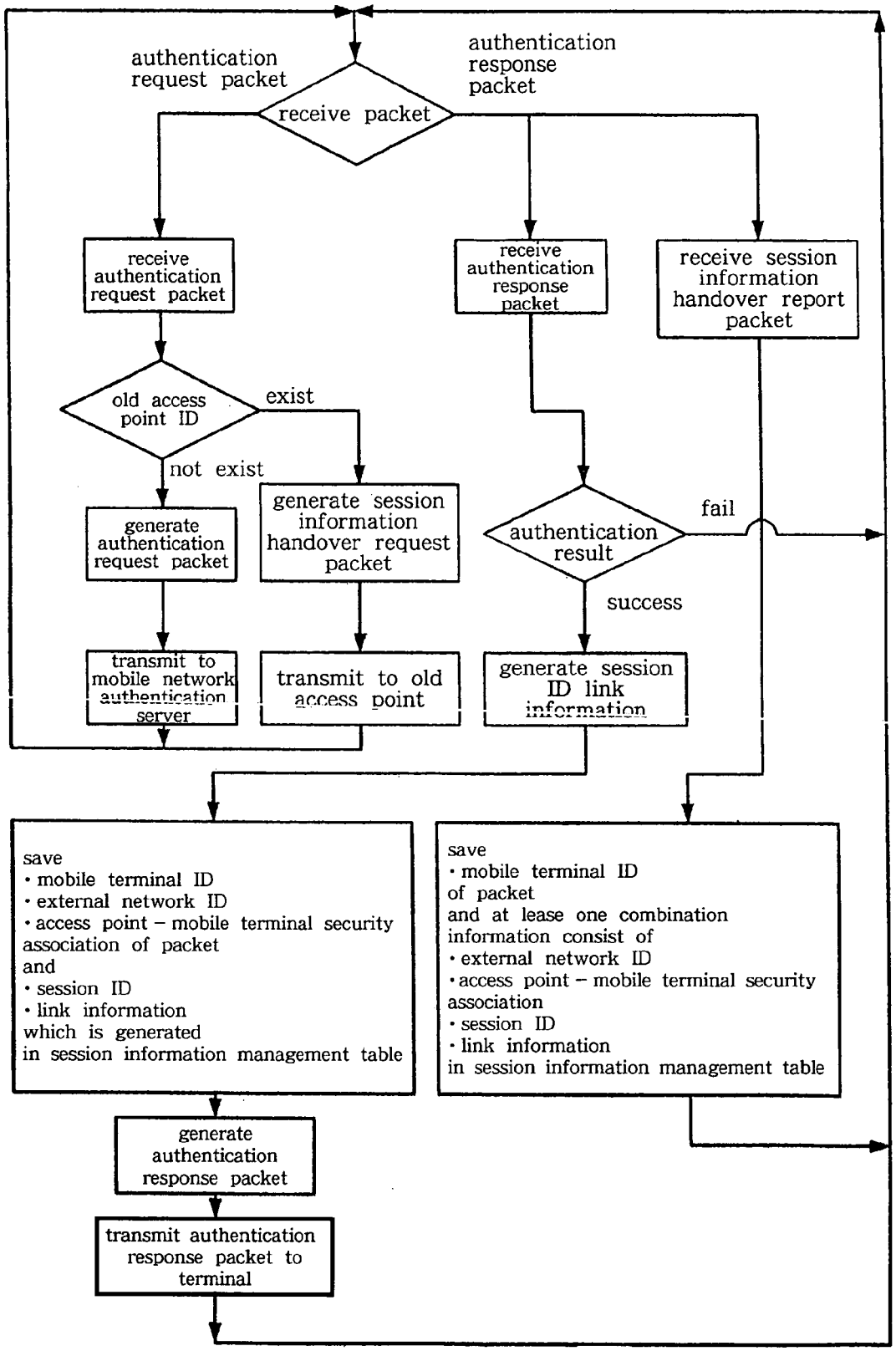
FIG. 20 is a flow chart showing the processing of packets relating to terminal authentication in a radio access point.

Explanation next regards the procedures for authentication of a terminal using the flow chart that is shown in FIG. 20.

Upon receiving from channel multiplexing/separation function CHMUX2 the authentication request packet that is shown in FIG. 11 that has been received from a mobile terminal, terminal authentication function TAUTH1 generates the authentication request packet that is shown in FIG. 16 and supplies this packet to radio access point control/management function APM1 for transmission to the mobile communication network authentication server.

Figure 17:
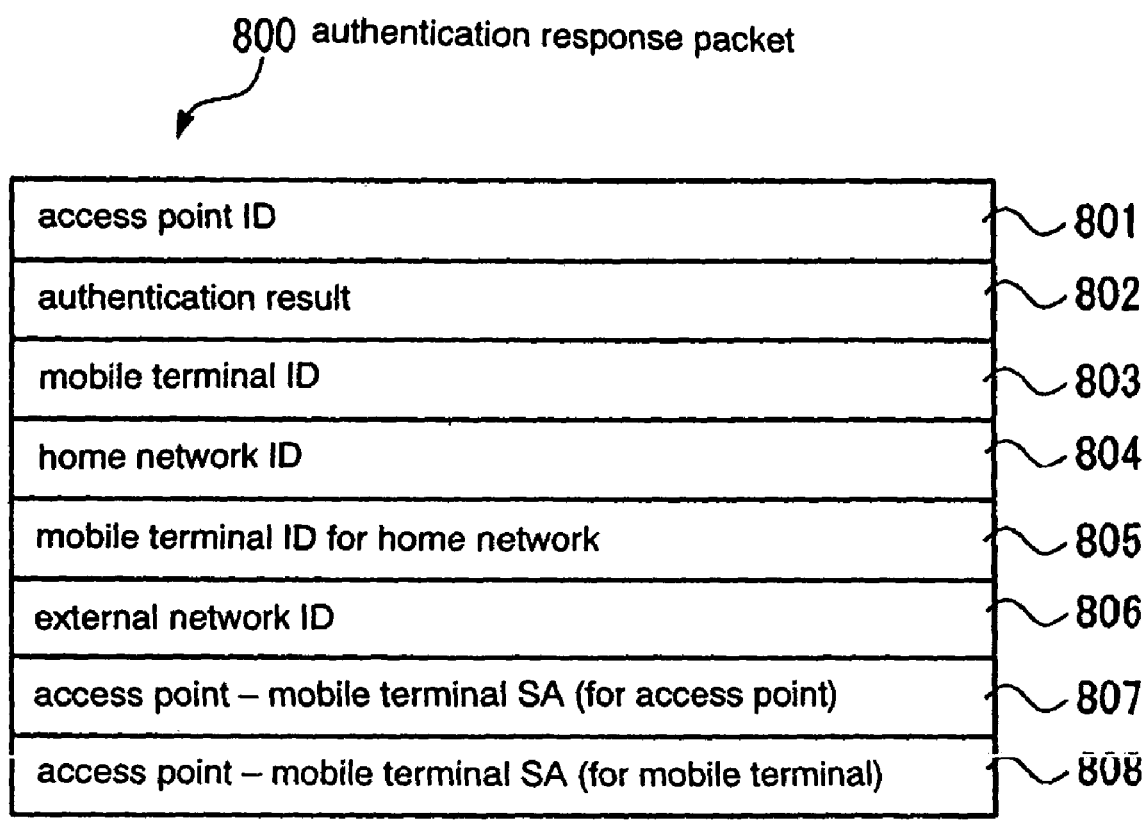
FIG. 17 shows the content of an authentication response packet that is transmitted to a radio access point by a mobile communication network authentication server.

Upon receiving from radio access point control/management function AMP1 the authentication response packet that is shown in FIG. 17 that has been received from the mobile communication network authentication server, terminal authentication function TAUTH1 first, if authentication result 802 of the authentication response packet indicates success, determines the ID used by the session between this mobile terminal X and external network 620 and determines link information 650 that is used by this session.

Terminal authentication function TAUTH1 then saves the content of the authentication response packet in the corresponding field of session information management table 600 that is shown in FIG. 15, and further, saves the generated session ID and link information in the corresponding fields of session information management table 600. Terminal authentication function TAUTH1 further generates the authentication response packet that is shown in FIG. 12 and supplies this packet as output to channel multiplexing/separation function CHMUX2 for transmission to a terminal.

Figure 21:
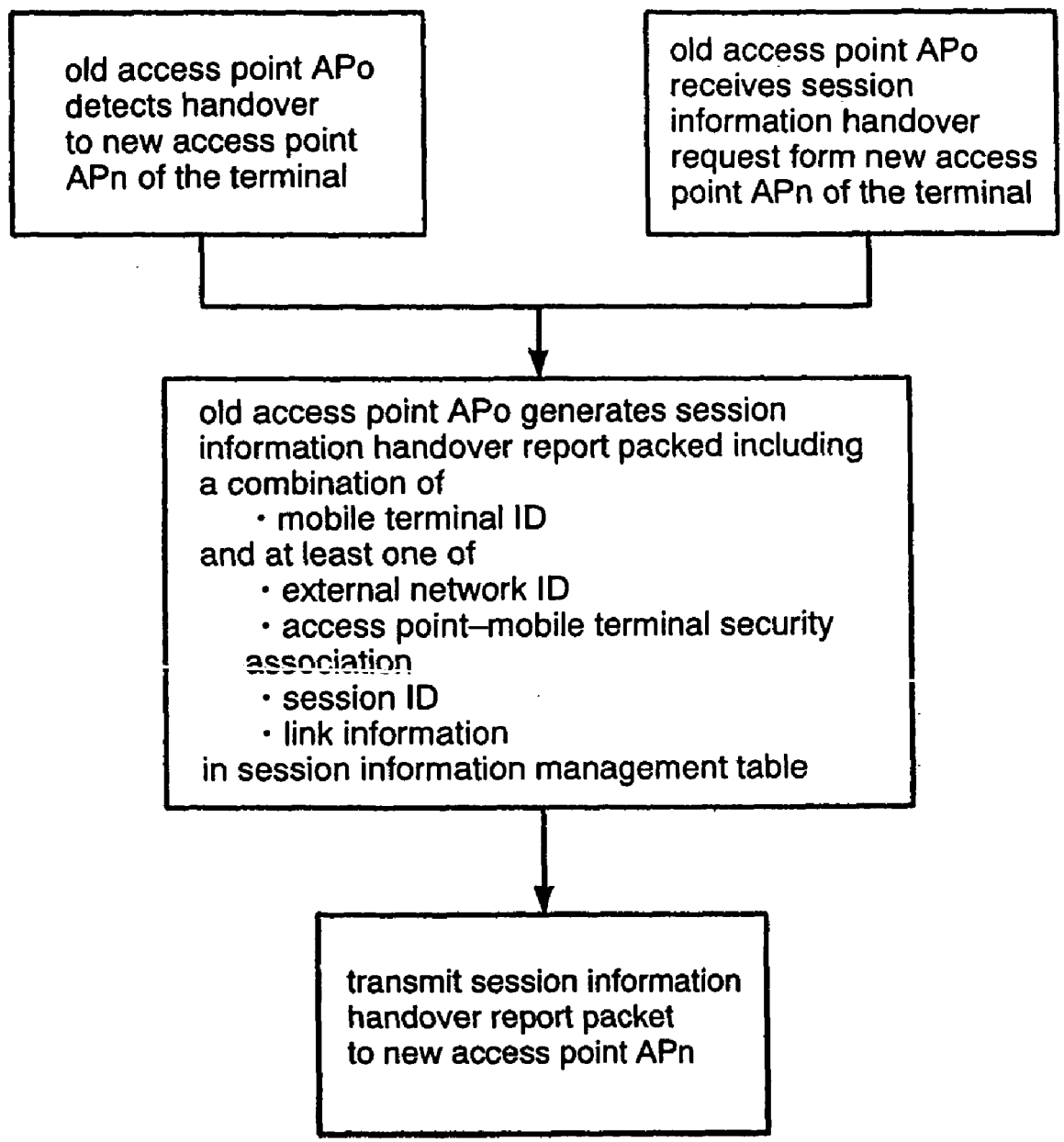
FIG. 21 is a flow chart showing the processing for transmission of session information handover report packets in a radio access point.

Explanation next regards a portion of the procedures of transferring session information with reference to the flow chart of FIG. 21.

Figure 18:
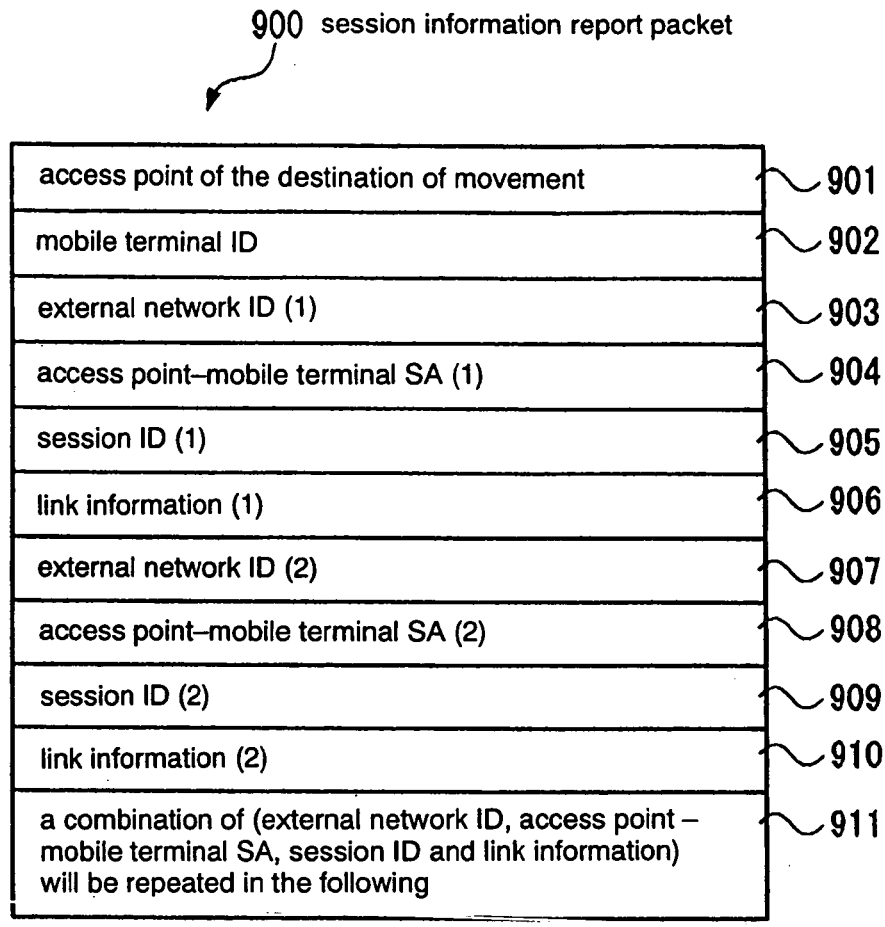
FIG. 18 shows the content of a session information report packet that is transmitted to a new radio access point by the old radio access point.

When the mobile terminal moves to the jurisdiction of another radio access point, session information handover function HOF1 generates the session information report packet that is shown in FIG. 18 based on the session information of that terminal (mobile terminal ID 610, external network ID 620, radio access point-mobile terminal authentication security association 630, session ID 640, and link information 650) that is saved in session information management table (FIG. 15), and supplies this session information report packet as output to radio access point control/management function APM1 for transmission to the radio access point of the destination of movement of the mobile terminal.

Session information handover function HOF1 further, upon receiving session information report packet 900 that is shown in FIG. 18 from another radio access point, saves mobile terminal ID 902, external network ID 903, radio access point-mobile terminal authentication security association 904, session ID 905, and link information 906 in session information management table (FIG. 15).

Explanation next regards a portion of the procedures of transferring session information using the flow chart of FIG. 20.

When an old radio access point ID has been set in authentication request packet 700 from mobile terminal X, terminal authentication function TAUTH1 reports this information to session information handover function HOF1 instead of carrying out the previously described authentication procedures. Session information handover function HOF1 generates session information handover request packet 1000 that is shown in FIG. 19 and transmits this packet to the old radio access point.

Figure 19:
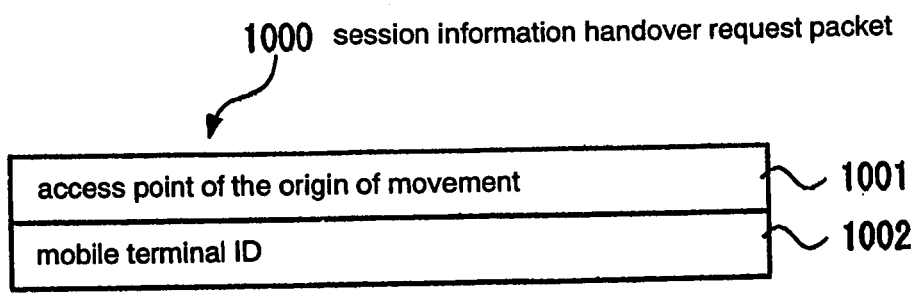
FIG. 19 shows the content of a session information request packet that is transmitted to the old radio access point by the new radio access point.

Session information handover function HOF1, upon receiving session information handover request packet 1000 that is shown in FIG. 19, transmits the session information handover report packet that is shown in FIG. 18 by the previously described procedures.

In the case of a wired access point, the configuration is identical to the case for a radio access point with the exception that radio transceiver TR07a is a transceiver for a wired line, and explanation is therefore here omitted.

Figure 22:
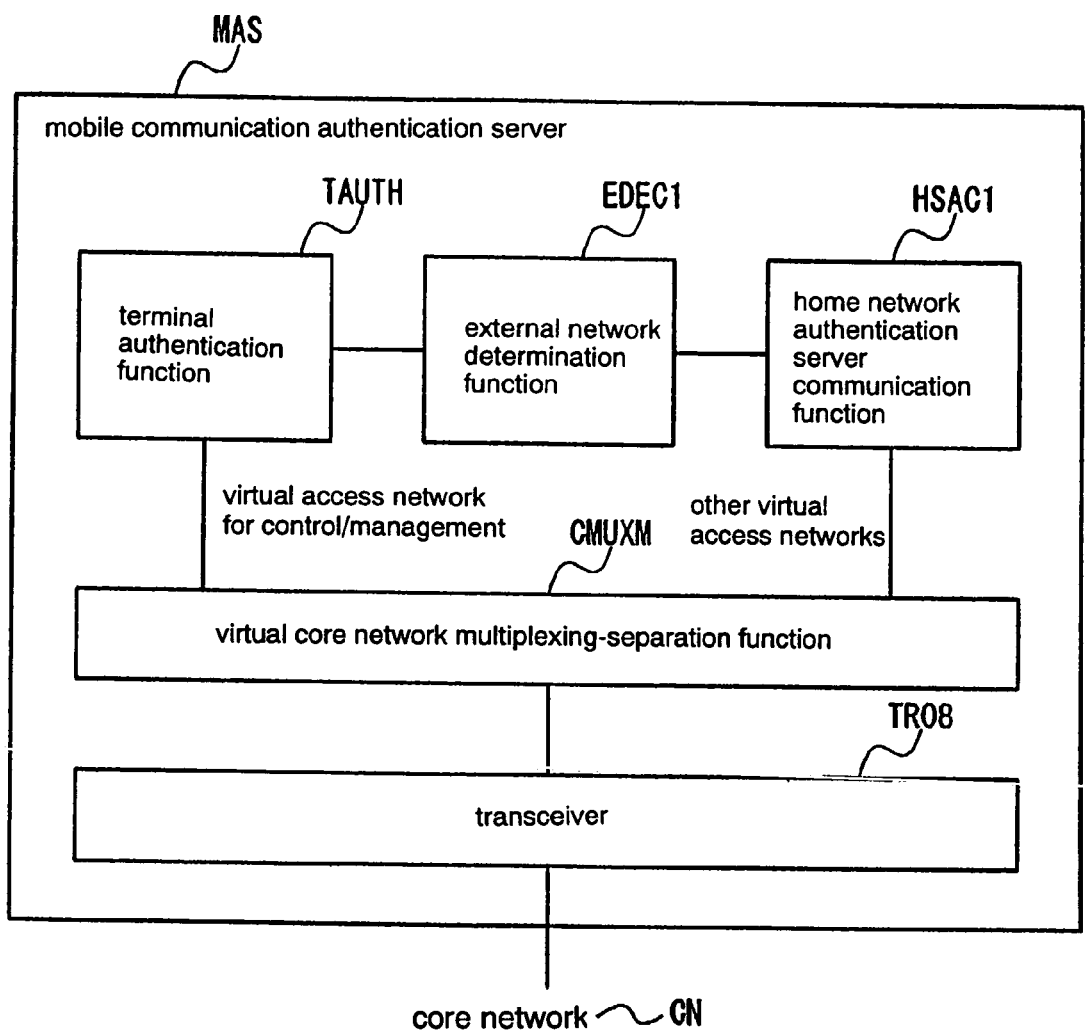
FIG. 22 shows the configuration of a mobile communication network authentication server.

FIG. 22 shows the configuration of a mobile communication network authentication server.

Mobile communication network authentication server MAS1 is made up from: transceiver TR08, virtual core network multiplexing/separation function CMUXM, terminal authentication function TAUTH, external network determination function EDEC1, and home network authentication server communication function HASC1.

Transceiver TR08 transmits packets to and receives packets from the core network CN.

Virtual core network multiplexing/separation function CMUXM separates packets that have been received as input from transceiver TR08 for each virtual core network; supplies packets that are received from external network (1) virtual core network VCN1, external network (2) virtual core network VCN2, and external network (3) virtual core network VCN3 as output to home network authentication server communication function HASC1; and supplies packets that are received from control/management virtual core network VCNS as output to terminal authentication function TAUTH.

Packets that have been received as input from home network authentication server communication function HASC1 and that are directed to external network (1) virtual core network VCN1, external network (2) virtual core network VCN2, and external network (3) virtual core network VCN3 are multiplexed for each virtual network with packets that have been received as input from terminal authentication function TAUTH and that are directed to control/management virtual core network VCNS and supplied as output to transceiver TR08.

Figure 27:
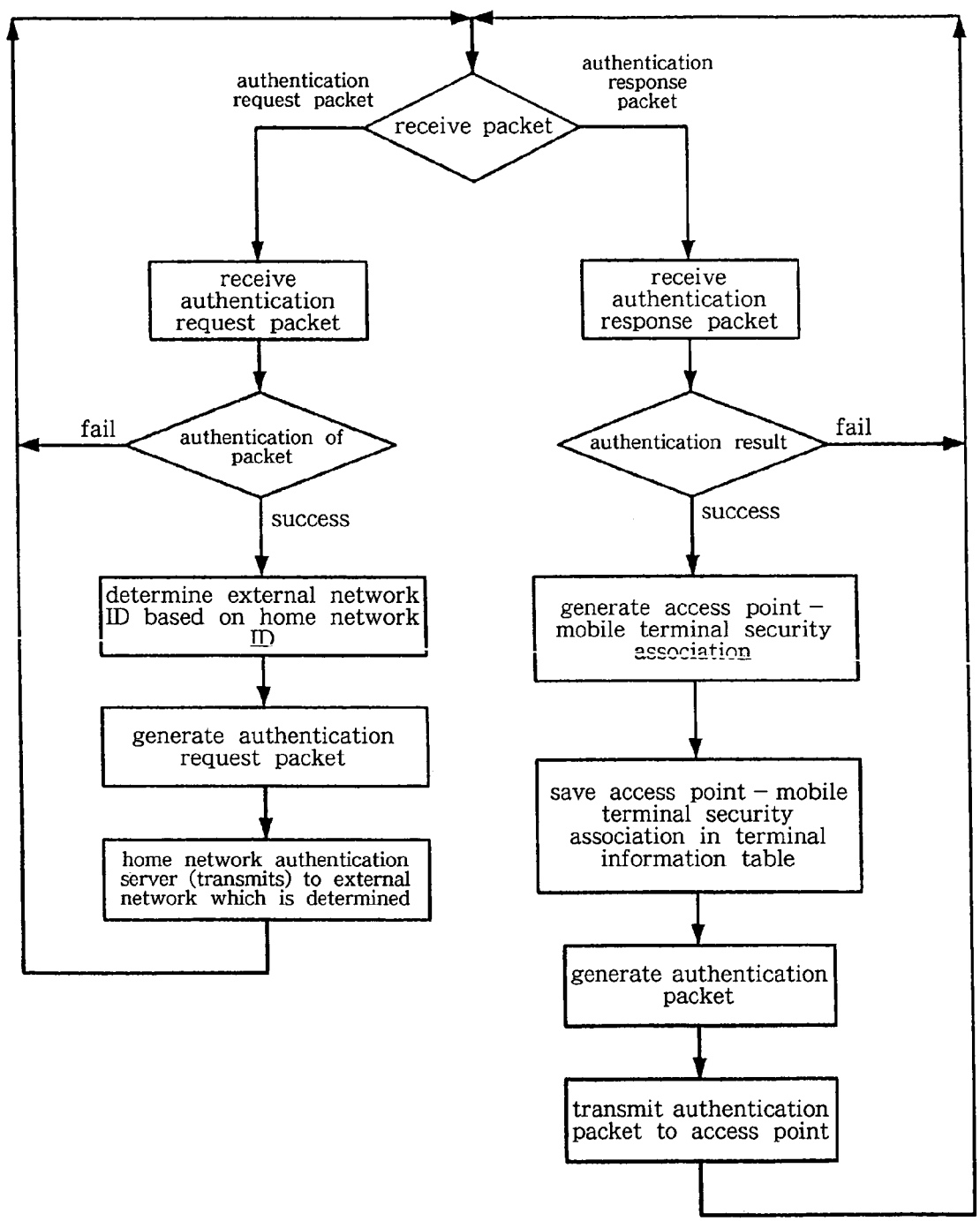
FIG. 27 is a flow chart showing the procedures of terminal authentication in a mobile communication network authentication server.

Explanation next regards the processing of packets relating to terminal authentication with reference to the flow chart shown in FIG. 27.

Terminal authentication function TAUTH holds the terminal information management table that is shown in FIG. 23. Upon receiving, from virtual core network multiplexing/separation function CMUXM, authentication request packet 700 that is shown in FIG. 16 that has been received from a radio access point, terminal authentication function TAUTH authenticates this packet based on terminal ID 1110 and mobile communication network-mobile terminal security association 1120 of the terminal information management table of FIG. 23. A successful authentication indicates that the mobile terminal has been authenticated in the mobile communication network.

At this time, terminal authentication function TAUTH refers to external network determination function EDEC1 for the external network ID that corresponds to the home network ID. External network determination function EDC1 holds the home network-external network correspondence table that is shown in FIG. 24 and answers external network ID 1220 based on this table. At this time, terminal authentication function TAUTH requests home network authentication server communication function HASC1 for the authentication of the mobile terminal to the home network.

Figure 25:
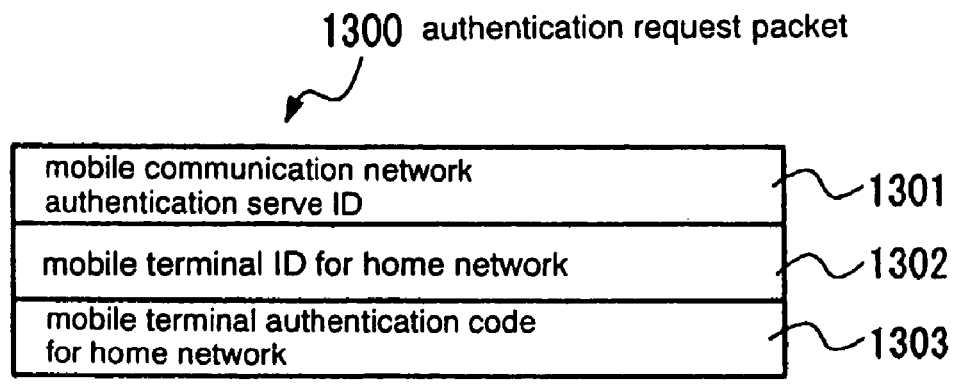
FIG. 25 shows the content of an authentication request packet that is transmitted to a home network authentication server by a mobile communication network authentication server.

In response, home network authentication server communication function HASC1 generates authentication request packet 1300 that is shown in FIG. 25, selects the corresponding external network virtual core network for transmitting to the authentication server of the home network, and supplies generated authentication request packet 1300 to virtual core network multiplexing/separation function CMUXM.

Figure 26:
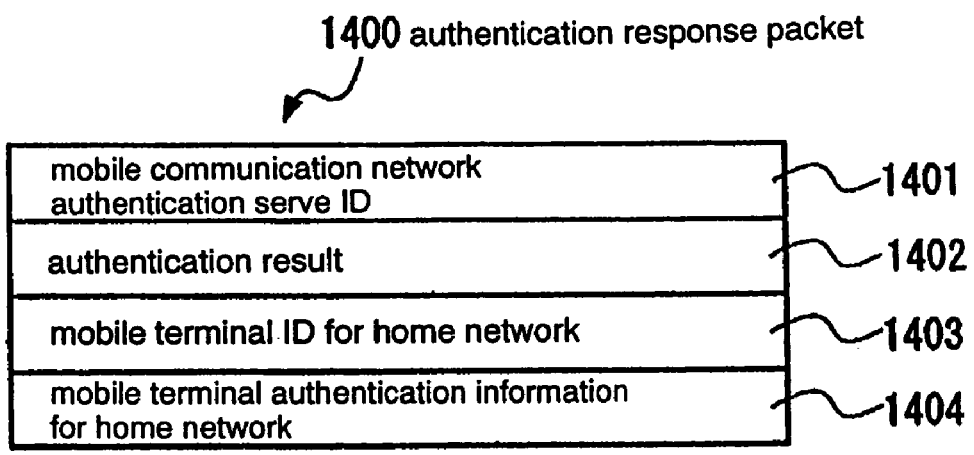
FIG. 26 shows the content of an authentication response packet that is transmitted to a mobile communication network authentication server by a home network authentication server.

In response, the home network authentication server authenticates the packets based on the home network mobile terminal ID and the home network-mobile terminal security association that is held in the home network, and replies with authentication response packet 1400 that is shown in FIG. 26.

Upon receiving as input authentication response packet 1400 that is shown in FIG. 26 from virtual core network multiplexing/separation function CMUXM, home network authentication server communication function HASC1 supplies this packet as output to terminal authentication function TAUTH. At this time, the mobile terminal has been authenticated in both the mobile communication network and the home network.

Terminal authentication function TAUTH produces a radio access point-mobile terminal security association that is used for authenticating packets between the radio access point and the mobile terminal, generates authentication response packet 800 that is shown in FIG. 17, and supplies this packet as output to virtual core network multiplexing/separation function CMUXM for transmission to the radio access point.

Figure 28:
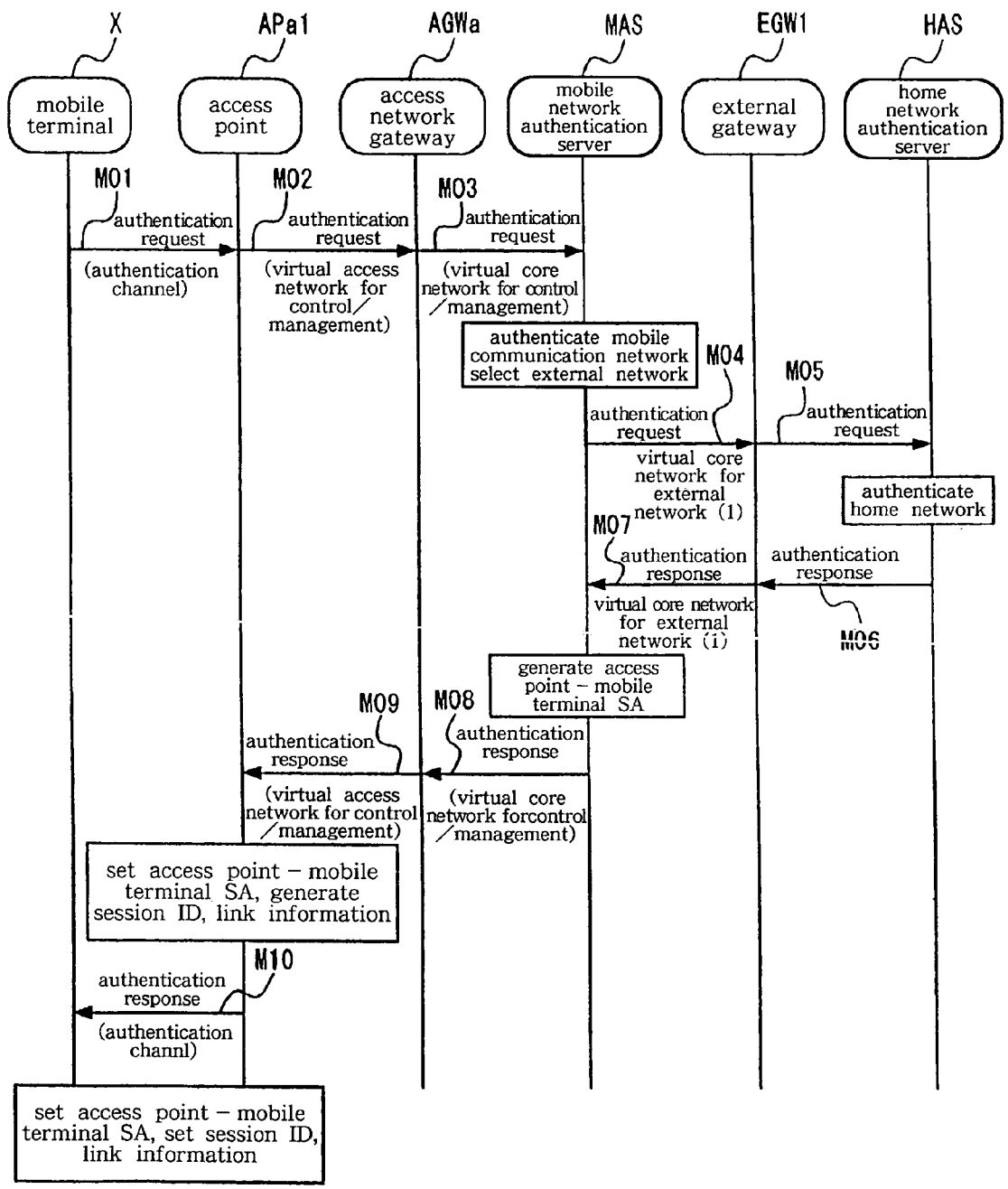
FIG. 28 shows the procedures of terminal authentication.

Explanation next regards the overall progression of mobile terminal authentication procedures that have been described to this point with reference to FIG. 28.

Mobile terminal X first generates authentication request packet 400 that is shown in FIG. 11 and transmits this packet to radio access point APa1 by way of authentication channel M01.

Radio access point APa1, having received this packet, generates authentication request packet 700 that is shown in FIG. 16 and transmits this packet to mobile communication network authentication server MAS by way of control/management virtual access network VANaS. Midway, access network gateway AGWa transfers the packet that has been received from control/management virtual access network VANaS to control/management virtual core network VCNS.

Mobile communication network authentication server MAS, having received this packet, both authenticates the mobile terminal and generates authentication request packet 1300 that is shown in FIG. 25, and transmits this packet to home network authentication server HAS1 by way of external network virtual core network VCN1 that corresponds to the destination home network. Midway, external network gateway EGW1 transfers the packet that has been received from external network virtual core network VCN1 to external network (1) EX1.

Home network authentication server HAS, having received this packet, both authenticates the mobile terminal and generates authentication response packet 1400 that is shown in FIG. 26 and transmits this packet to mobile communication network authentication server MAS. Midway, external network gateway EGW1 transfers the packet that has been received from external network EX1 to external network virtual core network VCN1.

Mobile communication network authentication server MAS, having received this packet, both generates a radio access point-mobile terminal security association and generates authentication response packet 800 that is shown in FIG. 17, and transmits this packet to radio access point APa1 by way of control/management virtual core network VCNS. Midway, access network gateway AGWa transfers the packet that has been received from control/management virtual core network VCNS to control/management virtual access network VANaS.

Radio access point APa1, having received this packet, saves radio access point-mobile terminal security association 506, generates both session ID 507 and the corresponding link information 508 as well as authentication response packet 500 that is shown in FIG. 12, and further, transmits this packet to mobile terminal X by way of the authentication channel.

Mobile terminal X, having received this packet, saves radio access point-mobile terminal security association 506, session ID 507, and the corresponding link information 508.

By proceeding through the above-described procedures, the terminal authentication of the mobile terminal, the mobile communication network, and the home network is completed, and a session for communication with an external network, link information for this session, and a security association are set between a mobile terminal and a radio access point.

Figure 29:
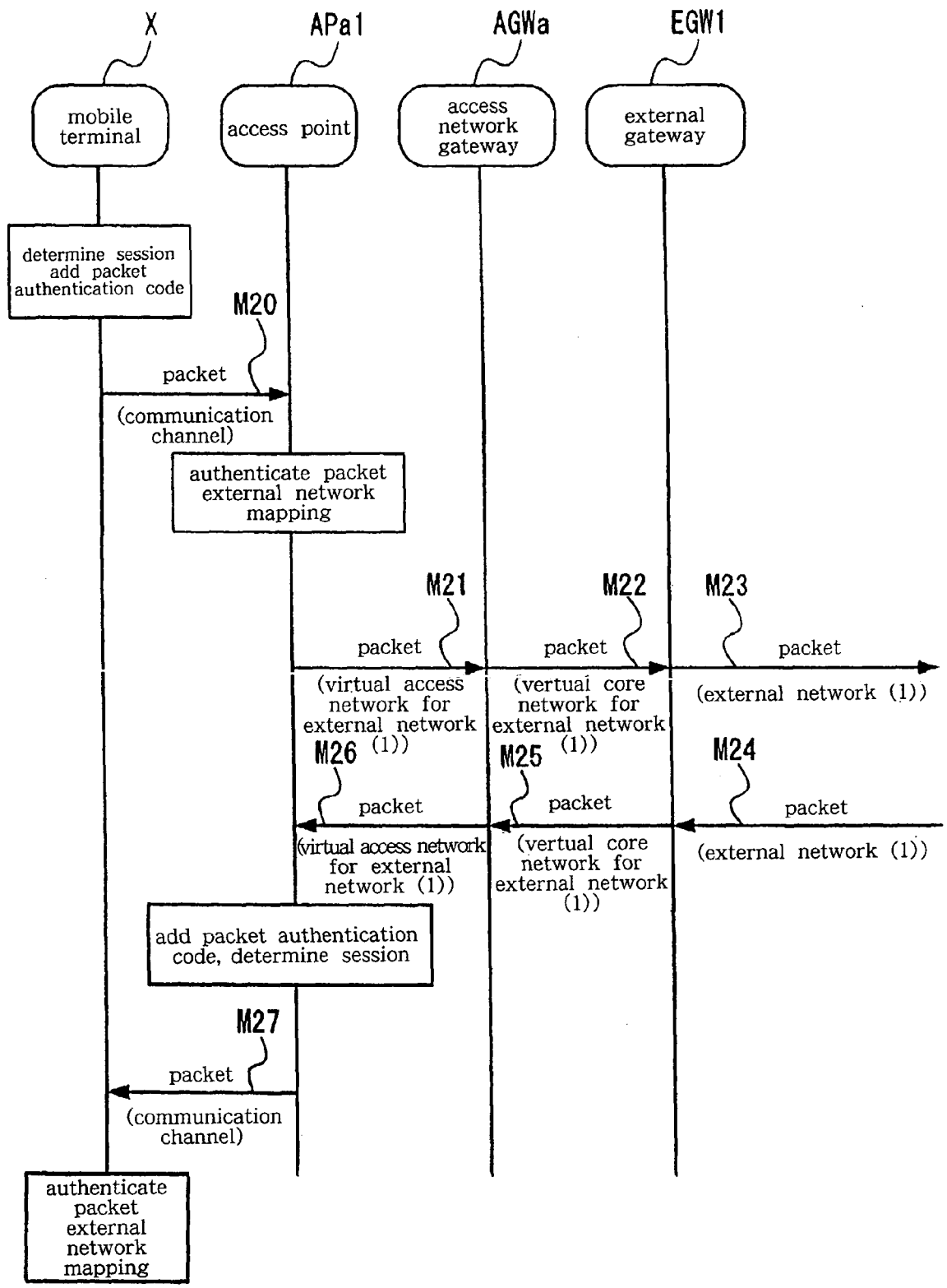
FIG. 29 shows the flow of transmission and reception of packets.

Explanation next regards the flow of the transmission and reception of packets following terminal authentication based on FIG. 29.

First, when communication entity ENT1 for each home network on mobile terminal X transmits packets, a session that corresponds to the home network is selected. Then, using the link information for this session, packets are transmitted on communication channel CH1 to radio access point APa1.

In radio access point APa1, packet authentication is first realized for the packets that have been received. The external network that corresponds to the session to which the packets belong is then selected, the selected external network in this case being external network (1); and the packets are supplied as output to the virtual access network for this external network, the virtual access network in this case being VANa1.

If the communication partner is subordinate to the same virtual access network, these packets are transmitted to the radio access point to which the communication partner is connected. If the communication partner is under a different access network or in an external network, the packets are supplied as output by way of access network gateway AGWa to the virtual core network, in this case VCN1, that corresponds to the virtual access network, in this case VANa1.

Further, if the communication partner is under the jurisdiction of another access network, the packets are transferred to that access network gateway by way of a virtual core network, in this case VCN1. If the communication partner is in an external network, the packets are supplied as output to the external network by way of an external network gateway, in this case EGW1.

The flow of processing when a mobile terminal receives packets is next shown.

When packets from external network (1) EX1 arrive, these packets are transferred on the corresponding virtual core network VCN1. These packets are transferred on the corresponding virtual access network VANa1 by way of access network gateway AGWa of the access network in which the mobile terminal is currently located. When radio access point APa1 receives the packets from the virtual access network for a particular external network, a session is selected based on this external network and the ID of the mobile terminal that is the destination of the packets.

A packet authentication code is then appended to the packets, and, using link information that corresponds to the session, the packets are then transmitted on communication channel CH1 to mobile terminal X.

Upon receiving the packets, mobile terminal X carries out packet authentication, and then, based on the session to which the packets belong, passes the packets to the communication entity for the appropriate home network.

Figure 30:
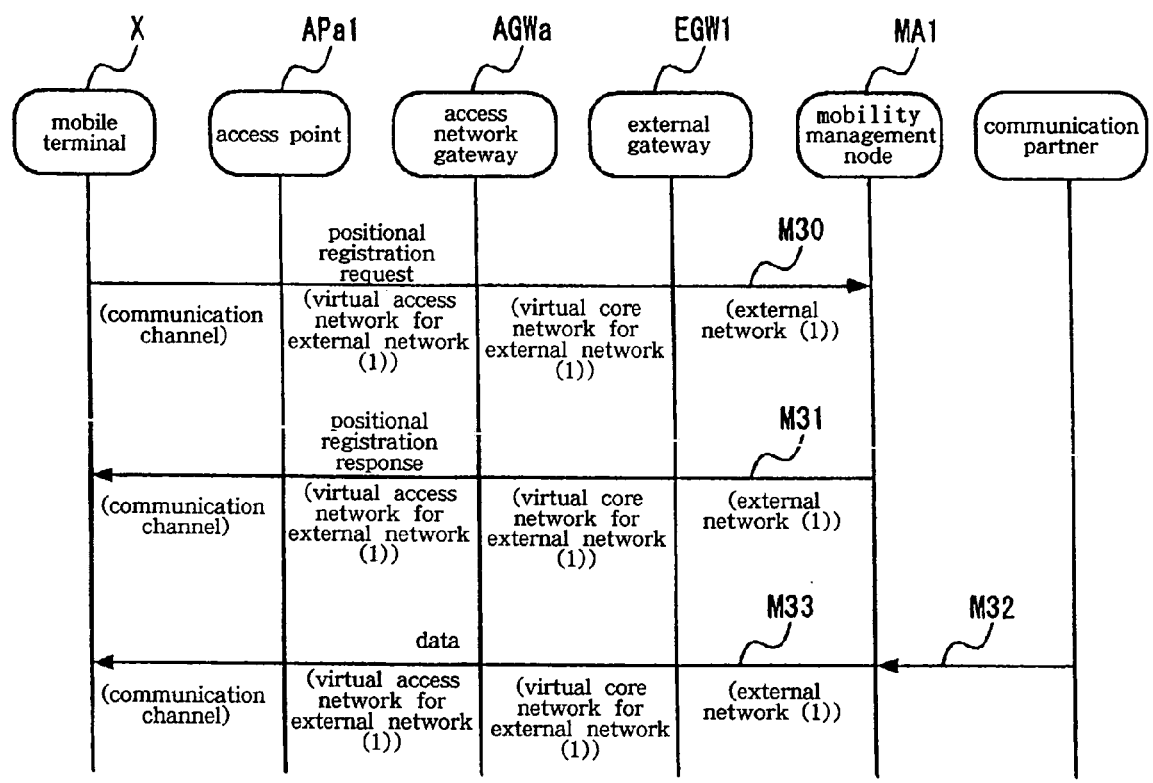
FIG. 30 shows the flow of positional registration to a mobility management node of a home network.

As one example, FIG. 30 shows the procedures for positional registration of mobile terminal X when mobility management node MA1 is arranged in external network EX1. Because this processing is performed through the use of an already existing technology such as mobile IP, only a summary will be shown. Positional registration request packet M30 is transmitted to mobility management node MA1 according to the previously described flow of packets.

Upon receiving this packet, mobility management node MA1 holds the position of the terminal and returns positional registration response packet M31 to mobile terminal X. Packets that are transmitted from other terminals addressed to this mobile terminal are first delivered to mobility management node MA1, and based on the positional information that is registered, the mobility management node transfers these packets to mobile terminal X.

Figure 31:
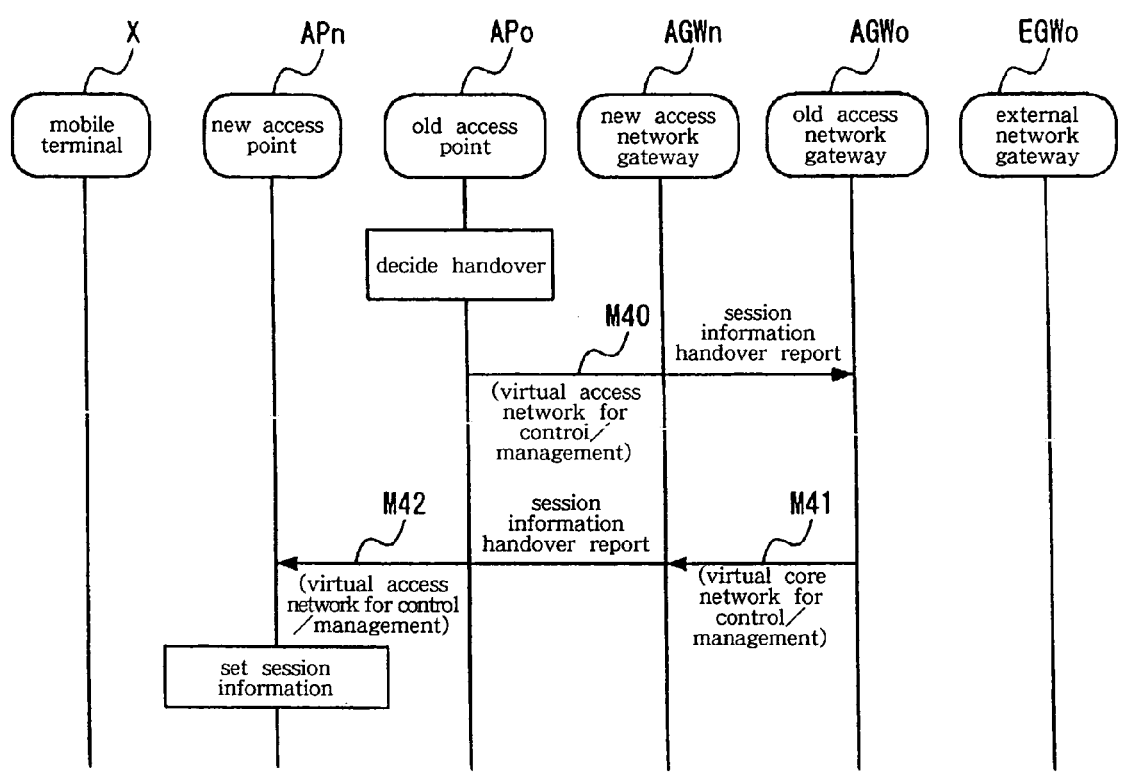
FIG. 31 shows the procedures for transferring session information to a new radio access point from the old radio access point.
Figure 32:
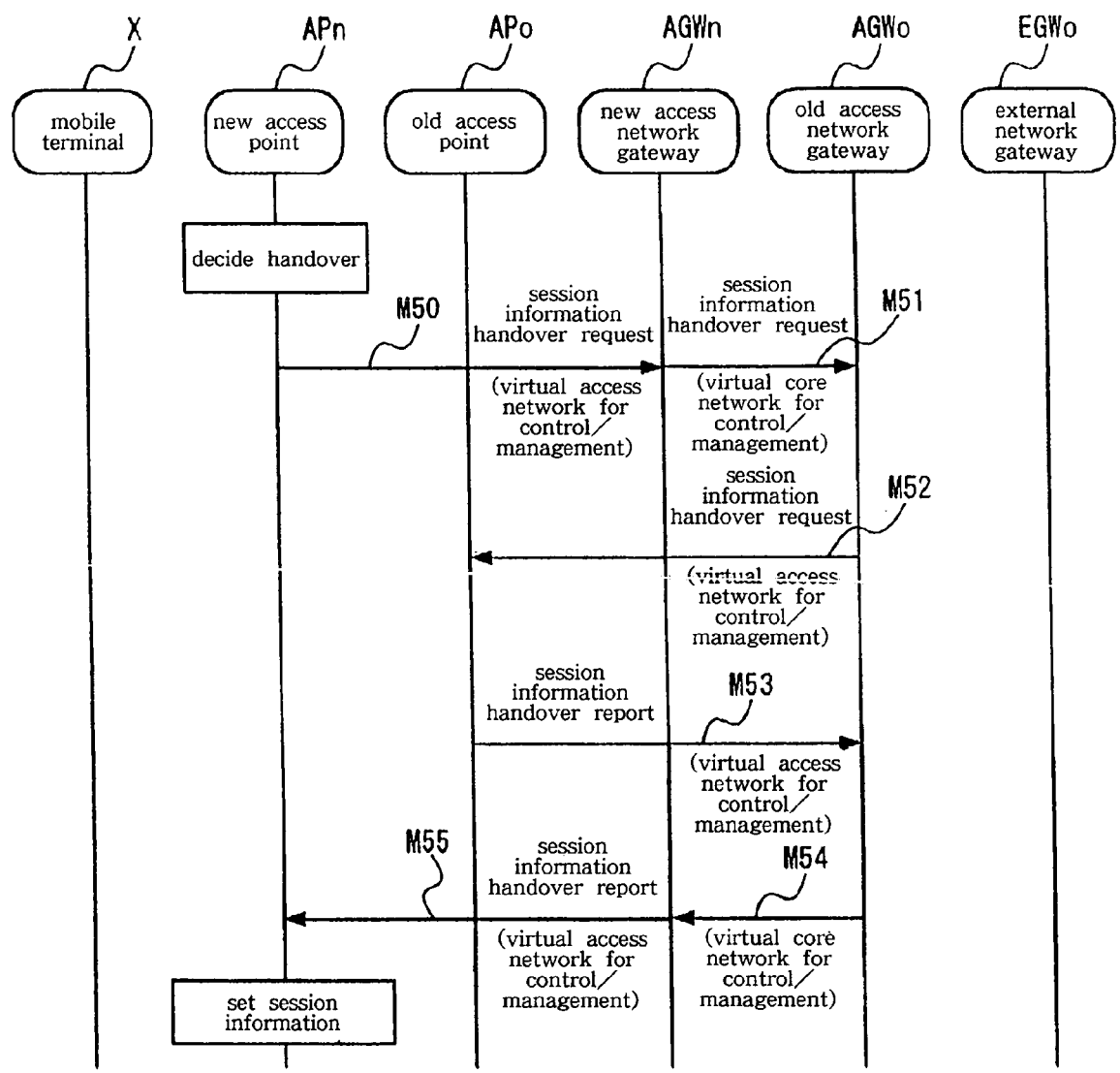
FIG. 32 shows the procedures for requesting transfer of session information from the new radio access point to the old radio access point.

FIG. 31 and FIG. 32 show the procedures for a case in which a mobile terminal is handed over from one radio access point to another radio access point.

There are three forms for this handover:

A form in which the mobile terminal determines that handover to a new radio access point will be carried out, and reports the new radio access point to the old radio access point to which it is currently connected.

A form in which the radio access point to which the mobile terminal is connected determines the new radio access point to which the mobile terminal is to be handed over and reports this to the mobile terminal.

A form in which, after the mobile terminal has been connected to the new radio access point, the mobile terminal then reports to the new radio access point the old radio access point to which it was previously connected.

FIG. 31 shows the procedures for first two of these forms. When old radio access point APo itself determines the new radio access point APn that is the handover destination of mobile terminal X, or when the new radio access point APn that is the handover destination is notified from mobile terminal X, the old radio access point APo before movement extracts all of the session information for this mobile terminal from the session information table, produces a session information handover report packet that is shown in FIG. 18, and transmits this packet to new radio access point APn after movement.

If the new radio access point is subordinate to another access network at this time, the packet is transferred by way of an access network gateway. The new radio access point APn sets this information in a session information management table.

FIG. 32 shows the procedures for the third form of the three handover forms described above. When the new radio access point APn after movement receives the authentication request packet that is shown in FIG. 11 from the mobile terminal, radio access point APn, based on the old radio access point ID that is set in this packet, transmits the session information handover request that is shown in FIG. 19 to radio access point APo, which is the old radio access point before movement.

Old radio access point APo extracts all session information for this mobile terminal from this session information table, produces the session information handover report packet that is shown in FIG. 18, and transmits this packet to radio access point APn, which is the new radio access point after movement. The new radio access point sets this information in a session information management table.

By means of the above-described procedures, a mobile terminal can continue communication with the same external network when moving to the jurisdiction of another radio access point.

Second Embodiment

Figure 33:
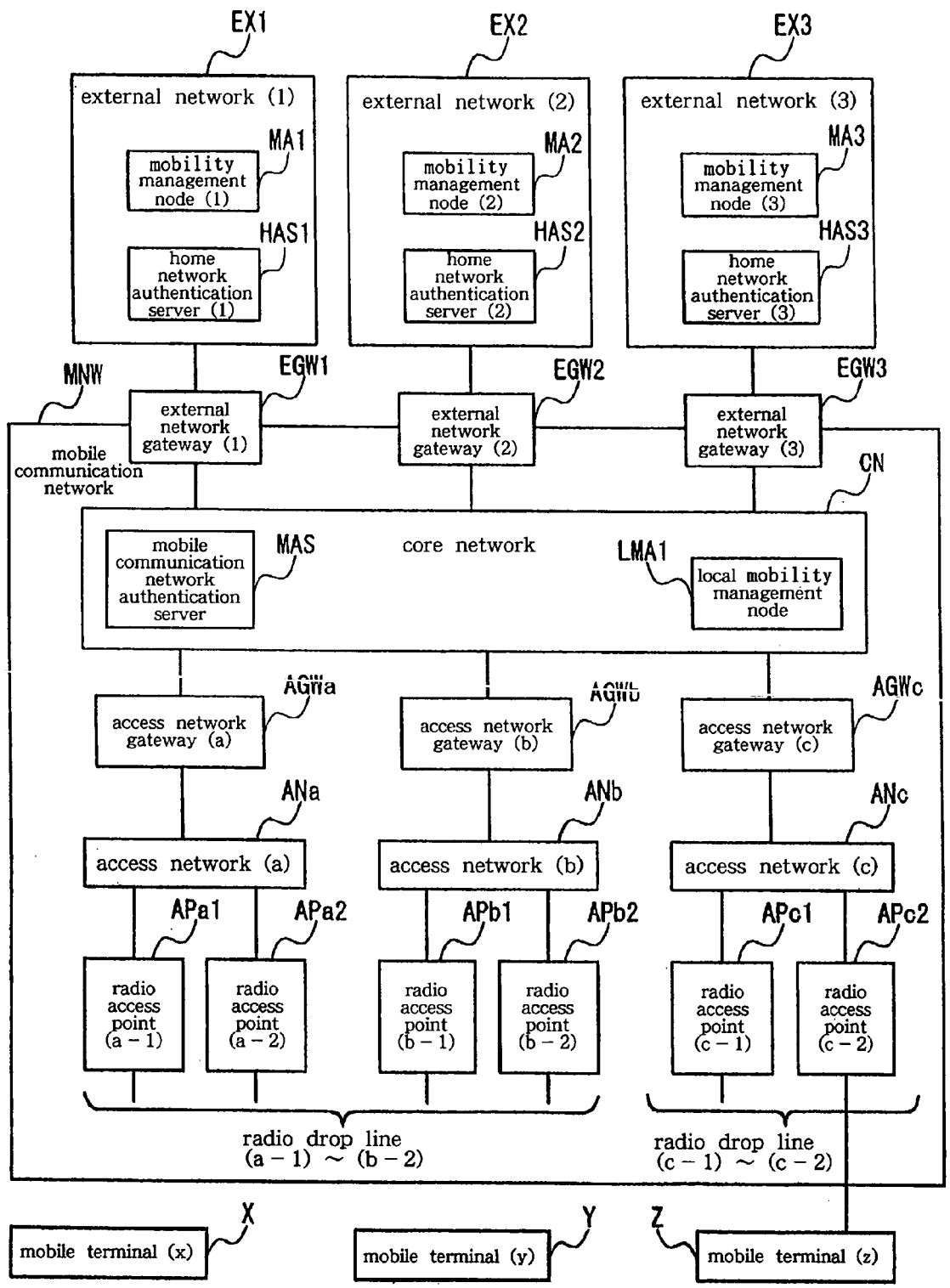
FIG. 33 shows the overall configuration in the second embodiment of the present invention.

Explanation next regards the second embodiment of the present invention with reference to FIG. 33. The configuration of the mobile communication network of FIG. 33 is essentially identical to that of FIG. 1, with the exception of the addition of local mobility management node LMA1 to the core network.

Figure 34:
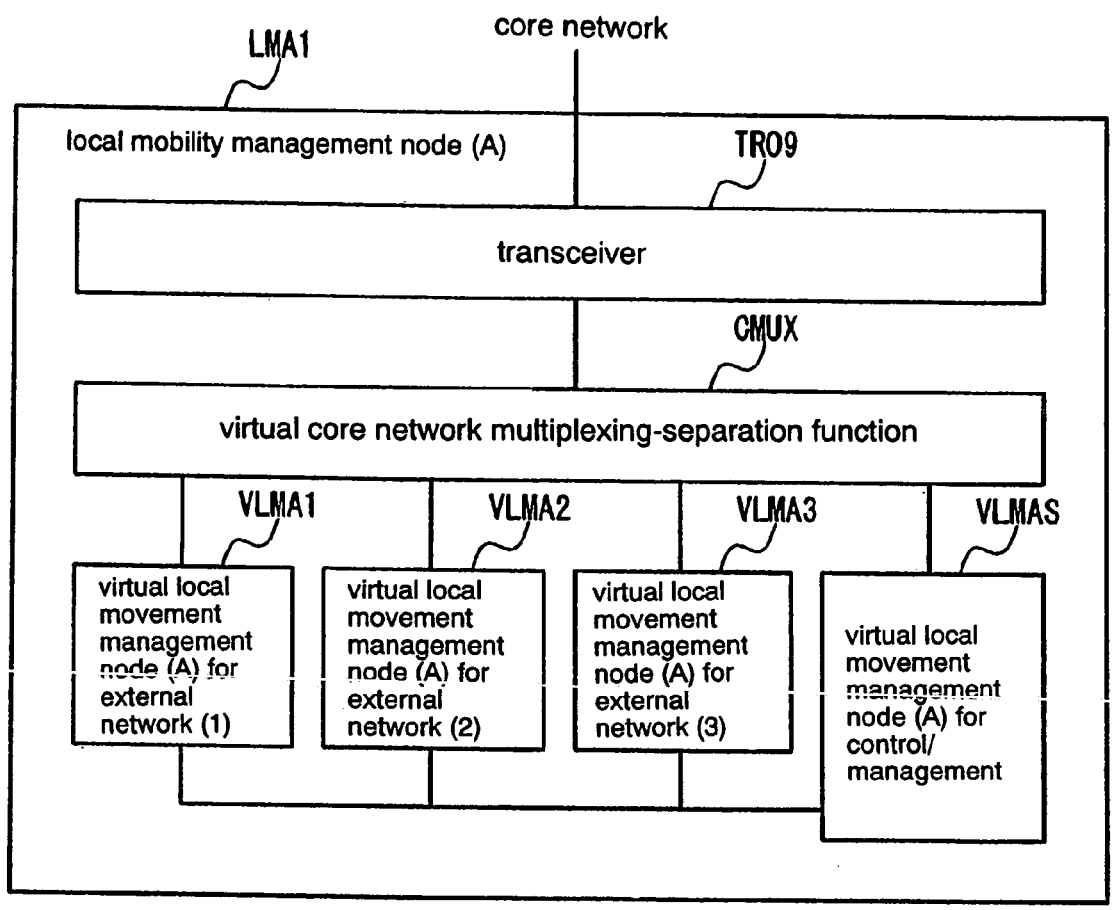
FIG. 34 shows the configuration of a local mobility management node in the second embodiment of the present invention.

FIG. 34 shows the configuration of local mobility management node LMA1. Local mobility management node LMA1 is made up from: transceiver TR09, virtual core network multiplexing/separation function CMUXL, external network (1) virtual local mobility management node VLMA1, external network (2) virtual local mobility management node VLMA2, external network (3) virtual local mobility management node VLMA3, and control/management virtual local mobility management node VLMAS.

Transceiver TR09 is connected to core network CN and transmits and receives packets.

Virtual core network multiplexing/separation function CMUXL separates packets that are received as input from core network-side transceiver TR09 for each virtual core network, supplying packets that have been received from external network (1) virtual core network VCN1 to external network (1) virtual local mobility management node VLMA1, and carrying out similar operations for external network (2) virtual core network VCN2, external network (3) virtual core network VCN3, and control/management virtual core network VCNS.

Virtual core network multiplexing/separation function CMUXL further supplies packets that have been received as input from external network (1) virtual local mobility management node VLMA1 as output to external network (1) virtual core network VCN1, performs similar processing for external network (2) virtual local mobility management node VLMA2, external network (3) virtual local mobility management node VLMA3, and control/management virtual local mobility management node VLMAS, multiplexes each virtual core network, and supplies the result to transceiver TR09.

Figure 35:
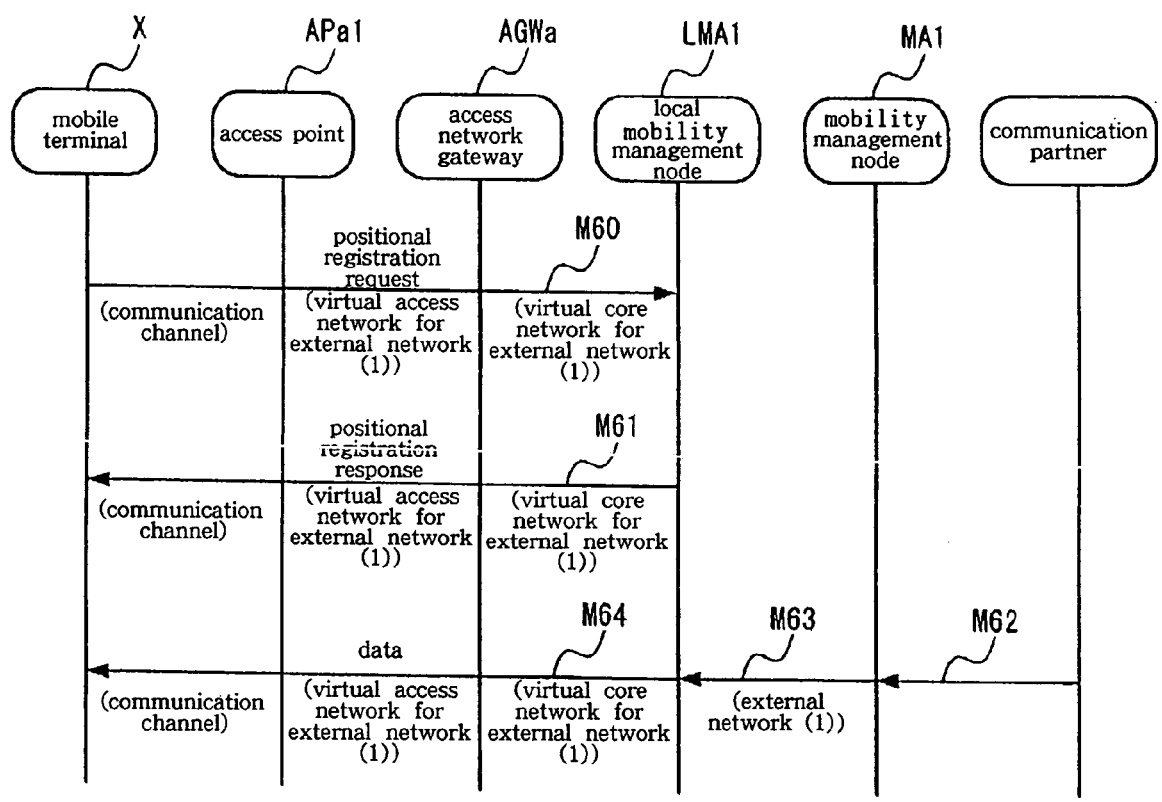
FIG. 35 shows the procedures, for positional registration to a local mobility management node.

Each of the virtual local mobility management nodes employs an already existing technology such as Mobile IP, and these procedures are next described using FIG. 35. Mobile terminal X transmits a positional registration request to external network (1) virtual local mobility management node VLMA1. External network (1) virtual local mobility management node VLMA1, having received this request, holds the positional information of the mobile terminal and transmits a positional registration response.

When packets addressed to mobile terminal X are sent in, external network (1) virtual local mobility management node VLMA1 also transfers these packets to the position that was reported from mobile terminal X, whereby a function for supporting the movement of the terminal on the virtual network is provided.

Although the present invention has been described hereinabove by presenting preferable embodiments and working examples, the present invention is not necessarily limited to the above-described embodiments and working examples and is open to various modifications within the scope of the technical concept of the invention.

The present invention as described hereinabove can realize the following effects:

When realizing communication between mobile terminals in the prior art, packets were transferred by way of external network gateways. In contrast, when realizing communication between mobile terminals in the present invention, communication is realized by returning at the radio access point when each of the mobile terminals is under the jurisdiction of the same radio access point, communication is realized by way of the access network when each of the mobile terminals is under the jurisdiction of the same access network, and communication is realized by way of a core network when each of the mobile terminals is under the jurisdiction of different access networks, whereby the efficiency of circuit use of core networks and access networks can be improved.

Moreover, regarding multicast communication, the efficiency of circuit use in the prior art was poor because multicast packets were copied a number of times equal to the number of mobile terminals that receive multicast packets in an external network gateway and then transferred to mobile terminals on tunnels. In the present invention, however, packets on core networks or access networks are transferred using multicast, and the efficiency is therefore improved.

In addition, according to the present invention, private networks are formed by virtual core networks and virtual access networks, whereby the inconvenience of establishing a security association between mobile terminals can be eliminated.

According to the present invention, moreover, communication between nodes on a mobile communication network is protected by means of control/management virtual core networks and virtual access networks, whereby the inconvenience of establishing a security association between nodes can be eliminated.

Finally, according to the present invention, the private leased line connection between a mobile terminal and an external network can be continued without interruption when mobile terminals implement handover.

What is claimed is:

1. A mobile communication network system, comprising:
a mobile communication network;
a plurality of external networks;
a plurality of mobile terminals;
a plurality of gateways for connecting said external networks and said mobile communication network; and
a plurality of radio access points for connecting said mobile terminals to said mobile communication network,
wherein, when packets are transmitted and received between said mobile terminals, the packets are communicated by way of virtual networks that are provided to correspond to each of said external networks on said mobile communication network,
wherein said mobile communication network is provided with said virtual networks that correspond to each of said external networks, and
wherein each of said external networks comprises a mobility management node and a home network authentication server.

2. The mobile communication network system according to claim 1, wherein said mobile communication network further comprises:
a control/management virtual network;
a unit for transmitting and receiving, by way of said control/management virtual network, packets for control and management that are exchanged between nodes that are arranged within said mobile communication network and that include said radio access points and mobility management nodes; and
a unit for refusing packets for control and management that have been received from sources other than said control/management virtual network.

3. The mobile communication network system according to claim 1, wherein said packets are communicated by way of said virtual networks rather than said external networks.

4. The mobile communication network system according to claim 1, wherein, in realizing communication between the mobile terminals, communication is realized by returning at a radio access point when each of the mobile terminals is under a jurisdiction of a same radio access point, communication is realized by way of an access network when each of the mobile terminals is under a jurisdiction of a same access network, and communication is realized by way of a core network when each of the mobile terminals is under a jurisdiction of different access networks.

5. A mobile communication network system that comprises:
a mobile communication network;
a plurality of external networks;
a plurality of mobile terminals;
a plurality of gateways for connecting said external networks and said mobile communication network; and
a plurality of radio access points for connecting said mobile terminals to said mobile communication network,
wherein said mobile communication network comprises means for offering virtual networks that correspond to each said external network;
wherein said gateways include means for connecting said external networks to a corresponding one of said virtual networks; and
wherein said mobile terminals include means for setting sessions with said radio access points for any of said external networks,
wherein said radio access points comprise:
means for transferring packets that have been received from any of said sessions to a virtual network that has been prepared for an external network that corresponds to that session; and
means for transferring packets, which have been received from said virtual network that corresponds to said external network, to a session that has been set for said external network by said mobile terminal that is a destination of these packets, and
wherein private leased line connections are provided between said mobile terminals and said external networks, and when transmission or reception of packets is realized between said mobile terminals, the packets are communicated by way of virtual networks that are provided to correspond to each of said external networks on said mobile communication network.

6. The mobile communication network system according to claim 5, wherein each of said radio access points comprises:
means for, when a mobile terminal is to be handed over from a current radio access point to which it is currently connected to a new radio access point, transferring information of all sessions that said mobile terminal has set to the new radio access point; and
means for acquiring setting information of said sessions that is transmitted in from said current radio access point.

7. The mobile communication network system according to claim 5, wherein said mobile communication network further comprises a mobility management node that comprises a plurality of virtual mobility management nodes that each comprises:
means that is prepared for each of said external networks for transmitting and receiving packets only with a virtual network that has been prepared for use by a corresponding external network;
means for holding positional information that has been reported from said mobile terminals; and
means for, when packets that are addressed to said mobile terminals are received, transferring these packets to positions that have been reported from said mobile terminals,
wherein each of said mobile terminals further comprises:
means for reporting positional information to said virtual mobility management node that corresponds to said external network to which the mobile terminal is to be connected.

8. The mobile communication network system according to claim 5, wherein said mobile communication network further comprises:
a control/management virtual network;
means for transmitting and receiving, by way of said control/management virtual network, packets for control and management that are exchanged between nodes that are arranged within said mobile communication network and that include said radio access points and mobility management nodes; and means for refusing packets for control and management that have been received from sources other than said control/management virtual network.

9. The mobile communication network system according to claim 6, wherein said mobile communication network further comprises:

a control/management virtual network;

means for transmitting and receiving, by way of said control/management virtual network, packets for control and management that are exchanged between nodes that are arranged within said mobile communication network and that include said radio access points and said mobility management nodes; and means for refusing packets for control and management that have been received from sources other than said control/management virtual network.

10. The mobile communication network system according to claim 7, wherein said mobile communication network further comprises:

a control/management virtual network;

means for transmitting and receiving, by way of said control/management virtual network, packets for control and management that are exchanged between nodes that are arranged within said mobile communication network and that include said radio access points and said mobility management nodes; and means for refusing packets for control and management that have been received from sources other than said control/management virtual network.

11. The mobile communication network system according to claim 5, wherein said packets are communicated by way of said virtual networks rather than said external networks.

12. The mobile communication network system according to claim 5, wherein, in realizing communication between the mobile terminals, communication is realized by returning at a radio access point when each of the mobile terminals is under a jurisdiction of a same radio access point, communication is realized by way of an access network when each of the mobile terminals is under a jurisdiction of a same access network, and communication is realized by way of a core network when each of the mobile terminals is under a jurisdiction of different access networks.

13. A mobile communication method in a mobile communication network system comprising:

a mobile communication network;
a plurality of external networks;
a plurality of mobile terminals;
a plurality of gateways for connecting said external networks and said mobile communication network; and
a plurality of radio access points for connecting said mobile terminals to said mobile communication network, said mobile communication method comprising:

setting, by a mobile terminal, a session for any of said external networks with said radio access points;

transferring, by a radio access point, packets that have been received from any said session to a virtual network that has been prepared for each of said external networks that corresponds to the session; and transferring, by said radio access point, packets that have been received from said virtual network that corresponds to any external network to the session that has been set for a use of said external network by said mobile terminal that is a destination of the packets.

14. The mobile communication method according to claim 13, further comprising:

transferring, by said radio access point, when a said mobile terminal is to be handed over from a current radio access point to which it is currently connected to a new radio access point, all of session information that said mobile terminal has set to said new radio access point; and acquiring, by said new radio access point, from said current radio access point, all of said session setting information that said mobile terminal has set.

15. The mobile communication method according to claim 13, further comprising:

transmitting and receiving, by each of a plurality of virtual mobility management nodes that are prepared for each of said external networks and that together constitute a mobility management node that is provided within said mobile communication network, packets only with a virtual network that has been prepared for the use of a corresponding said external network;

reporting, by said mobile terminal, positional information to said virtual mobility management node that corresponds to said external network to which said mobile terminal is connected; and holding, by each of said virtual mobility management nodes, positional information that has been reported from said mobile terminal, and upon receiving packets that are addressed to said mobile terminal, transferring these packets to a position that is reported from said mobile terminal.

16. The mobile communication method according to claim 14, further comprising:

transmitting and receiving packets for control and management that are transmitted and received between said radio access points, mobility management nodes, and said gateways that are arranged within said mobile communication network by way of a control/management virtual network that is provided within said mobile communication network; and refusing packets for control and management that have been received from a source other than a control/management virtual network.

17. The mobile communication method according to claim 15, further comprising:

transmitting and receiving packets for control and management that are transmitted and received between said radio access points, said mobility management nodes, and said gateways that are arranged within said mobile communication network by way of a control/management virtual network that is provided within said mobile communication network; and refusing packets for control and management that have been received from a source other than said control/management virtual network.

18. The mobile communication method according to claim 13, wherein said packets are communicated by way of said virtual network rather than said external networks.

19. The mobile communication method according to claim 13, wherein, in realizing communication between the mobile terminals, communication is realized by returning at a radio access point when each of the mobile terminals is under a jurisdiction of a same radio access point, communication is realized by way of an access network when each of the mobile terminals is under a jurisdiction of a same access network, and communication is realized by way of a core network when each of the mobile terminals is under a jurisdiction of different access networks.

* * * * *